(12) United States Patent
Miyauchi et al.

(10) Patent No.: US 8,155,223 B2
(45) Date of Patent: Apr. 10, 2012

(54) RECEIVING DEVICE, RECEIVING METHOD, AND PROGRAM

(75) Inventors: Toshiyuki Miyauchi, Kanagawa (JP); Takashi Yokokawa, Kanagawa (JP); Takuya Okamoto, Chiba (JP)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 12/562,469

(22) Filed: Sep. 18, 2009

(65) Prior Publication Data

US 2010/0074382 A1  Mar. 25, 2010

(30) Foreign Application Priority Data

Sep. 19, 2008  (JP) .............................. P2008-240275

(51) Int. Cl.
*H04L 27/28* (2006.01)
*H04L 27/00* (2006.01)

(52) U.S. Cl. ........................................ 375/260; 375/316

(58) Field of Classification Search .................. 375/260, 375/130, 132, 147, 316, 348, 350; 370/208, 370/210

See application file for complete search history.

(56) References Cited

U.S. PATENT DOCUMENTS

| 6,614,852 | B1 | 9/2003 | Laurent |
| 7,706,479 | B2 * | 4/2010 | Adachi ........................ 375/340 |
| 7,817,738 | B2 * | 10/2010 | Takeuchi et al. .............. 375/260 |
| 2003/0012308 | A1 | 1/2003 | Sampath et al. |
| 2003/0138060 | A1 | 7/2003 | Alcouffe |

FOREIGN PATENT DOCUMENTS

| JP | 2005 312027 | 11/2005 |
| JP | 2007 202081 | 8/2007 |
| JP | 2009 44364 | 2/2009 |

* cited by examiner

*Primary Examiner* — Khai Tran
(74) *Attorney, Agent, or Firm* — Frommer Lawrence & Haug LLP; William S. Frommer; Thomas F. Presson

(57) ABSTRACT

A receiving device includes a pilot signal extractor, an estimator, an interpolator, a distortion corrector, a calculator, and a determiner.

14 Claims, 27 Drawing Sheets

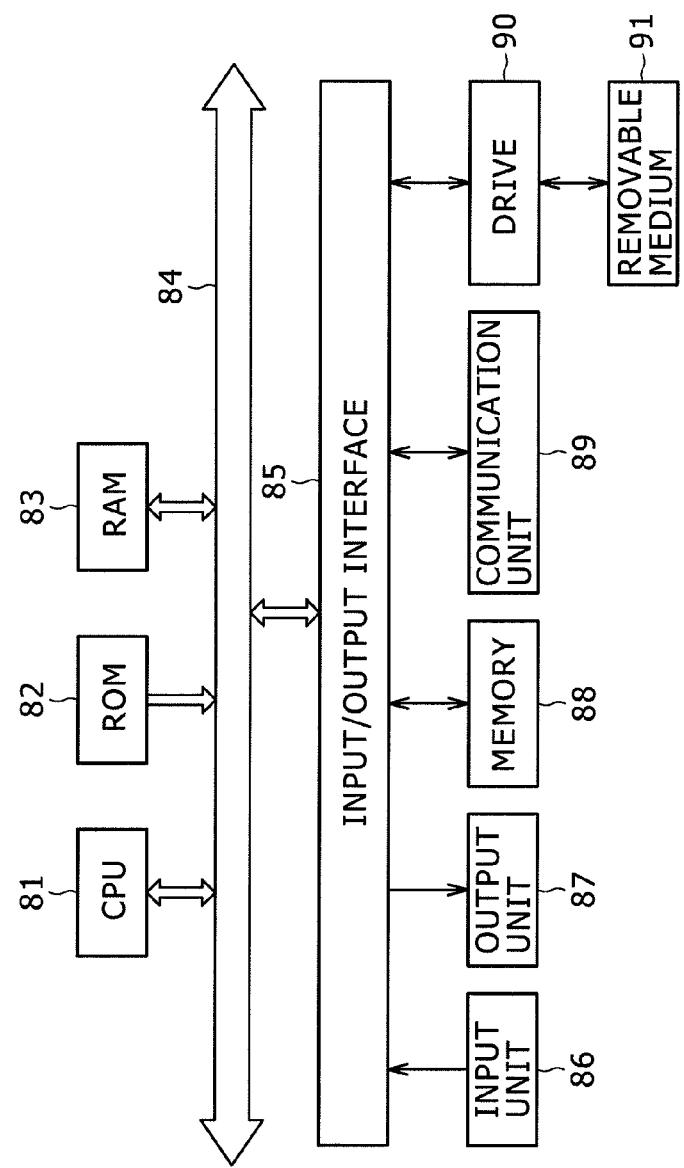

RECEIVING DEVICE, RECEIVING METHOD, AND PROGRAM

BACKGROUND OF THE INVENTION

1. Field of the Invention

The present invention relates to receiving devices, receiving methods, and programs, and particularly to a receiving device, a receiving method, and a program that allow making of a high-precision determination as to whether or not the channel environment is a single path environment or a near delay path environment.

2. Description of the Related Art

As a modulation system for terrestrial digital broadcasting, a modulation system called an orthogonal frequency division multiplexing (OFDM) system is used.

In the OFDM system, a large number of orthogonal subcarriers are set in the transmission band. Furthermore, data is allocated to the amplitude and phase of each subcarrier and digital modulation is carried out by phase shift keying (PSK) or quadrature amplitude modulation (QAM).

The OFDM system has a characteristic that the total transmission rate thereof is similar to that of existing modulation systems although the band per one subcarrier is narrow and the transmission rate is low in the OFDM system because the whole of the transmission band is divided by the large number of subcarriers. Furthermore, the OFDM system has a characteristic that the robustness against the multipath can be enhanced by providing a guard interval to be described later.

Moreover, in the OFDM system, modulation can be carried out by inverse fast Fourier transform (IFFT) operation for performing inverse Fourier transform because data are allocated to plural subcarriers. Demodulation of an OFDM signal obtained as a result of the modulation can be carried out by fast Fourier transform (FFT) operation for performing Fourier transform.

Therefore, a transmitting device for transmitting the OFDM signal can be formed by using a circuit for performing the IFFT operation, and a receiving device for receiving the OFDM signal can be formed by using a circuit for performing the FFT operation.

Due to the above-described characteristics, the OFDM system is frequently applied to terrestrial digital broadcasting, which is highly susceptible to the influence of multipath interference. Examples of the standard of the terrestrial digital broadcasting for which the OFDM system is employed include digital video broadcasting-terrestrial (DVB-T), integrated services digital broadcasting-terrestrial (ISDB-T), and ISDB-terrestrial for sound broadcasting (ISDB-TSB).

FIG. 1 is a diagram showing OFDM symbols.

In the OFDM system, signal transmission is carried out based on the unit called the OFDM symbol.

As shown in FIG. 1, one OFDM symbol is composed of a useful symbol that is the signal interval for which the IFFT is performed at the time of transmission and a guard interval (hereinafter, referred to as GI) obtained by copying the waveform of one part in the latter half of the useful symbol. The GI is inserted at the position previous to the useful symbol on the time axis. In the OFDM system, inserting the GI can prevent interference between the OFDM symbols, which occur under a multipath environment.

If the length of the useful symbol in the OFDM symbol, i.e. the useful symbol duration as the duration that does not include the guard interval, is Tu [seconds] and the interval between subcarriers is Fc [Hz], the relationship expressed by an equation Fc=1/Tu is satisfied.

One OFDM transmission frame is formed by assembling a plurality of such OFDM symbols. For example, in the ISDB-T standard, one OFDM transmission frame is formed of 204 OFDM symbols. The insertion positions of a pilot signal are defined on the basis of the unit of this OFDM transmission frame.

In the OFDM system in which a QAM modulation system is used as the modulation system for the respective subcarriers, the amplitude and phase of the subcarrier at the time of transmission differ from those at the time of reception on each subcarrier basis due to the influence of a multipath and so on in transmission. Therefore, the receiving side needs to carry out signal equalization so that the amplitude and phase of the received signal may become equal to those of the transmitted signal.

In the OFDM system, pilot signals having predetermined amplitude and a predetermined phase are inserted in a transmission symbol in a scattered manner on the transmitting side. In addition, the receiving side obtains the frequency characteristic of the channel based on the amplitude and phase of the pilot signals to thereby equalize the received signal.

The pilot signal used to calculate the channel characteristic is referred to as the scattered pilot signal (hereinafter, referred to as the SP signal). FIG. 2 shows an arrangement pattern of the SP signals in OFDM symbols, employed in the DVB-T standard and the ISDB-T standard. In FIG. 2, the vertical direction corresponds to the time direction and the horizontal direction corresponds to the frequency direction.

FIG. 3 is a block diagram showing a configuration example of an OFDM receiver of a related art.

A tuner 2 carries out frequency conversion of an RF signal received by a receiving antenna 1 into an IF signal and outputs the IF signal to an A/D conversion circuit 3.

The A/D conversion circuit 3 executes A/D conversion for the IF signal supplied from the tuner 2 and outputs the digital IF signal to a quadrature demodulation circuit 4.

The quadrature demodulation circuit 4 performs quadrature demodulation by using a carrier supplied from a carrier generation circuit 5 to thereby acquire a baseband OFDM signal and output it. This baseband OFDM signal is a time domain signal before FFT operation.

Hereinafter, the baseband OFDM signal before the FFT operation will be referred to as the OFDM time domain signal. The OFDM time domain signal is obtained as a complex signal including a real-axis component (I-channel signal) and an imaginary-axis component (Q-channel signal) as a result of the quadrature demodulation. The OFDM time domain signal output from the quadrature demodulation circuit 4 is supplied to the carrier generation circuit 5, an FFT circuit 6, an FFT interval control circuit 7, and a delay profile estimation circuit 10.

The carrier generation circuit 5 generates a carrier having predetermined frequency based on the OFDM time domain signal supplied from the quadrature demodulation circuit 4 and outputs the carrier to the quadrature demodulation circuit 4.

The FFT circuit 6 extracts the signal in the range of the useful symbol duration from the signal of one OFDM symbol based on an FFT trigger pulse supplied from the FFT interval control circuit 7. Furthermore, the FFT circuit 6 performs the FFT operation for the extracted OFDM time domain signal to thereby extract the data carried by the quadrature modulation of the respective subcarriers.

The start position of the FFT operation is any position in the range from position A in FIG. 1, which is equivalent to a boundary of the OFDM symbol, to position B, which is equivalent to the boundary between the GI and the useful symbol. The FFT operation range is referred to as the FFT interval, and the start position of the FFT interval is specified by the FFT trigger pulse supplied from the FFT interval control circuit 7.

The FFT circuit 6 outputs an OFDM signal representing the extracted data. This OFDM signal is a frequency domain signal obtained after the FFT operation. Hereinafter, the OFDM signal obtained after the FFT operation will be referred to as the OFDM frequency domain signal. The OFDM frequency domain signal is supplied to a SP extraction circuit 8-1 and a divider circuit 8-4 in a channel distortion compensation circuit 8.

The FFT interval control circuit 7 decides the FFT interval based on the OFDM time domain signal supplied from the quadrature demodulation circuit 4 and a delay profile estimated by the delay profile estimation circuit 10, and outputs the FFT trigger pulse to the FFT circuit 6.

The channel distortion compensation circuit 8 includes the SP extraction circuit 8-1, a time direction characteristic estimation circuit 8-2, a frequency direction characteristic interpolation circuit 8-3, and the divider circuit 8-4.

The SP extraction circuit 8-1 extracts the SP signals from the OFDM frequency domain signal and removes the modulation component of the SP signals to thereby estimate the channel characteristic for the SP signals. The SP extraction circuit 8-1 outputs channel characteristic data representing the estimated channel characteristic to the time direction characteristic estimation circuit 8-2.

The time direction characteristic estimation circuit 8-2 estimates the channel characteristic for the respective OFDM symbols arranged along the time direction from the subcarrier in which the SP signal is disposed, based on the channel characteristic estimated by the SP extraction circuit 8-1. For example, by using the channel characteristic for a SP signal $SP_1$ in FIG. 2 and the channel characteristic for a SP signal $SP_2$, estimated by the SP extraction circuit 8-1, the time direction characteristic estimation circuit 8-2 estimates the channel characteristic for the other symbols in area $A_1$ in FIG. 2.

The SP signal is inserted in every twelfth subcarrier in an OFDM symbol of the same time. Therefore, the channel characteristic of every third subcarrier is estimated by the time direction characteristic estimation circuit 8-2. The time direction characteristic estimation circuit 8-2 outputs data representing the estimated channel characteristic of every third subcarrier. The data output from the time direction characteristic estimation circuit 8-2 is supplied to the frequency direction characteristic interpolation circuit 8-3 and the delay profile estimation circuit 10.

The frequency direction characteristic interpolation circuit 8-3 executes frequency interpolation processing as processing of interpolating the channel characteristic in the frequency direction to thereby estimate the channel characteristic of the subcarriers for each OFDM symbol in the frequency direction from the channel characteristic of every third subcarrier.

The frequency interpolation processing is realized by applying a low pass filter to data arising from triple upsampling for the data representing the channel characteristic of every third subcarrier. The frequency direction characteristic interpolation circuit 8-3 is given plural low pass filters as the interpolation filter, and the interpolation filter used in the frequency interpolation processing is specified by a filter selection signal supplied from a frequency interpolation filter selection circuit 11. For example, the frequency direction characteristic interpolation circuit 8-3 estimates the channel characteristic for, of the positions of the OFDM symbol included in area $A_2$ in FIG. 2, the positions for which the channel characteristic is yet to be estimated.

As a result, the channel characteristic of all of the subcarriers is estimated. The frequency direction characteristic interpolation circuit 8-3 outputs, to the divider circuit 8-4, data representing the result of the estimation of the channel characteristic of all of the subcarriers.

The divider circuit 8-4 corrects distortion included in the OFDM frequency domain signal based on the channel characteristic of all of the subcarriers, supplied from the frequency direction characteristic interpolation circuit 8-3. The divider circuit 8-4 outputs the OFDM frequency domain signal whose distortion has been corrected to an error correction circuit 9.

The error correction circuit 9 executes deinterleave processing for a signal interleaved on the transmitting side and executes processing such as depuncturing, Viterbi decoding, diffusion signal removal, and RS decoding. The error correction circuit 9 outputs the data obtained through the various kinds of processing to the subsequent-stage circuit as decoded data.

The delay profile estimation circuit 10 estimates the delay profile of the channel by obtaining the time response characteristic of the channel. For example, the delay profile estimation circuit 10 estimates the delay profile by performing IFFT for the channel characteristic estimated by the time direction characteristic estimation circuit 8-2 and executing threshold processing for the result of the IFFT. The part from which a value equal to or smaller than the threshold is obtained is regarded as a noise component, and it is determined that a path exists in the part from which a value exceeding the threshold is obtained.

The delay profile estimated by the delay profile estimation circuit 10 is supplied to the FFT interval control circuit 7 and the frequency interpolation filter selection circuit 11. As the method for estimating the delay profile, a method is also known in which the delay profile is estimated from an OFDM time domain signal by utilizing a matched filter (MF) whose tap coefficient is the GI period.

The frequency interpolation filter selection circuit 11 obtains the delay spread based on the delay profile estimated by the delay profile estimation circuit 10, and selects the interpolation filter having the filter band suitable for the delay spread. The frequency interpolation filter selection circuit 11 outputs the filter selection signal specifying the selected interpolation filter to the frequency direction characteristic interpolation circuit 8-3.

FIG. 4 is a diagram showing a configuration example of the frequency direction characteristic interpolation circuit 8-3.

As shown in FIG. 4, the frequency direction characteristic interpolation circuit 8-3 includes frequency interpolation filter circuits 8-3$a_0$ to 8-3$a_{N-1}$, and a selector circuit 8-3b. The data that is output from the time direction characteristic estimation circuit 8-2 and represents the channel characteristic of every third subcarrier is input to the frequency interpolation filter circuits 8-3$a_0$ to 8-3$a_{N-1}$. The filter selection signal output from the frequency interpolation filter selection circuit 11 is input to the selector circuit 8-3b.

Each of the frequency interpolation filter circuits 8-3$a_0$ to 8-3$a_{N-1}$ executes the frequency interpolation processing for the data representing the channel characteristic of every third subcarrier by using the given interpolation filter, and outputs data representing the result of the frequency interpolation processing to the selector circuit 8-3b.

In the example of FIG. 4, the frequency interpolation filter circuit 8-3$a_0$ executes the interpolation processing by using an interpolation filter having a filter band BW0, and the frequency interpolation filter circuit 8-3$a_1$ executes the interpolation processing by using an interpolation filter having a filter band BW1. The frequency interpolation filter circuit 8-3$a_{N-1}$ executes the interpolation processing by using an interpolation filter having a filter band BW(N-1). FIG. 5 is a diagram in which the filter bands BW0 to BW3 are represented on the time axis.

In the example of FIG. 5, the bandwidth of the filter band BW0 is the largest and the bandwidth of the filter band BW3 is the smallest. The position of the upward white triangle indicates the center position of the filter band. The frequency interpolation processing is executed in such a way that the center position of the filter band is set to the same position as the center position of the delay spread.

The selector circuit 8-3$b$ selects, from the data supplied from the frequency interpolation filter circuits 8-3$a_0$ to 8-3$a_{N-1}$, the data of the result of the interpolation of the channel characteristic, obtained by the frequency interpolation processing with use of the interpolation filter specified by the filter selection signal. The signal selected by the selector circuit 8-3$b$ is output to the divider circuit 8-4.

Examples of documents of related arts include Japanese Patent Laid-open No. 2002-232390 and Japanese Patent Laid-open No. 2008-35377.

SUMMARY OF THE INVENTION

By the way, it is general that the GI is excluded from the subject of the FFT operation. However, if the signal as the subject of the FFT operation is a cyclic prefix OFDM signal, it is possible to effectively utilize the information of the GI if the channel environment is a single path environment free from a delay path. In this feature, the following characteristic is utilized: the signal of the GI corresponds with the signal of the interval that exists at the end of the useful symbol and is used as the copy source for the GI.

For example, a window function for carrying out the following operation is applied. Specifically, the amplitude of the signal of the GI and the signal of the interval as the copy source for the GI is halved, and the signal of the GI having the halved amplitude is added to the signal of the interval as the copy source having the halved amplitude. In addition, the interval other than the GI and the interval as the copy source is multiplied by one. Thereafter, the FFT interval whose start position is the same as the end position of the GI is set and the FFT operation is performed. This can enhance the S/N ratio of the interval as the copy source for the GI.

It is necessary to determine that the channel environment is a single path environment with high precision in order to perform such FFT operation with the effective utilization of the signal of the GI. However, the precision of the determination is often insufficient in the related-art determining method with use of a delay profile. Threshold processing is executed in the estimation of the delay profile as described above. In this processing, a noise component is often detected as a path erroneously.

If an erroneous determination is made as to whether or not the channel environment is a single path environment and the FFT operation is performed after such a window function is applied although the channel environment is not a single path environment, the signal other than the GI is added to the signal of the interval as the copy source for the GI. This results in the deterioration of the signal obtained as a result of the demodulation.

Furthermore, if it can be determined with high precision that the channel environment is a single path environment, the band of the interpolation filter and so on can be set for this single path in the frequency interpolation processing. Therefore, the signal quality could be enhanced.

There is a need for the present invention to allow making of a high-precision determination as to whether or not the channel environment is a single path environment or a near delay path environment.

According to an embodiment of the present invention, there is provided a receiving device including a pilot signal extractor configured to extract a pilot signal from a received OFDM signal, an estimator configured to estimate the characteristic of the channel of the OFDM signal for the pilot signal and interpolate a channel characteristic in the time direction to thereby obtain the channel characteristic of every predetermined number of subcarriers, and an interpolator configured to carry out filtering of the channel characteristic of every predetermined number of subcarriers by an interpolation filter having a first band for interpolating a channel characteristic in the frequency direction to thereby obtain a first all-subcarrier channel characteristic, and carry out filtering of the channel characteristic of every predetermined number of subcarriers by an interpolation filter having a second band wider than the first band for interpolating a channel characteristic in the frequency direction to thereby obtain a second all-subcarrier channel characteristic. The receiving device further includes a distortion corrector configured to correct distortion of the OFDM signal by using the first all-subcarrier channel characteristic and correct distortion of the OFDM signal by using the second all-subcarrier channel characteristic, a calculator configured to calculate the quality of each of the OFDM signals whose distortion has been corrected, and a determiner configured to determine whether or not the channel environment is a single path environment or a near delay path environment in which all paths are allowed to be included in the passband of an interpolation filter having the first band, based on the quality of a first distortion-corrected signal that is the OFDM signal whose distortion has been corrected by using the first all-subcarrier channel characteristic and the quality of a second distortion-corrected signal that is the OFDM signal whose distortion has been corrected by using the second all-subcarrier channel characteristic.

According to other embodiments of the present invention, there are provided a receiving method and a program each including the steps of extracting a pilot signal from a received OFDM signal, estimating the characteristic of the channel of the OFDM signal for the pilot signal and interpolating a channel characteristic in the time direction to thereby obtain the channel characteristic of every predetermined number of subcarriers, and carrying out filtering of the channel characteristic of every predetermined number of subcarriers by an interpolation filter having a first band for interpolating a channel characteristic in the frequency direction to thereby obtain a first all-subcarrier channel characteristic, and carrying out filtering of the channel characteristic of every predetermined number of subcarriers by an interpolation filter having a second band wider than the first band for interpolating a channel characteristic in the frequency direction to thereby obtain a second all-subcarrier channel characteristic. The receiving method and the program each further include the steps of correcting distortion of the OFDM signal by using the first all-subcarrier channel characteristic and correcting distortion of the OFDM signal by using the second all-subcarrier channel characteristic, calculating the quality of each of the OFDM signals whose distortion has been corrected, and determining whether or not the channel environment is a single path environment or a near delay path environment in which all paths are allowed to be included in the passband of an interpolation filter having the first band, based on the quality of a first distortion-corrected signal that is the OFDM signal whose distortion has been corrected by using the first all-subcarrier channel characteristic and the quality of a second distortion-corrected signal that is the OFDM signal whose distortion has been corrected by using the second all-subcarrier channel characteristic.

In the embodiments of the present invention, the pilot signal is extracted from the received OFDM signal. The characteristic of the channel of the OFDM signal for the pilot signal is estimated and the channel characteristic is interpolated in the time direction to thereby obtain the channel characteristic of every predetermined number of subcarriers. Filtering of the channel characteristic of every predetermined number of subcarriers is carried out by the interpolation filter having the first band for interpolating the channel characteristic in the frequency direction to thereby obtain the first all-subcarrier channel characteristic. Furthermore, filtering of the channel characteristic of every predetermined number of subcarriers is carried out by the interpolation filter having the second band wider than the first band for interpolating the channel characteristic in the frequency direction to thereby obtain the second all-subcarrier channel characteristic. Distortion of the OFDM signal is corrected by using the first all-subcarrier channel characteristic, and distortion of the OFDM signal is corrected by using the second all-subcarrier channel characteristic. The quality of each of the OFDM signals whose distortion has been corrected is calculated. In addition, it is determined whether or not the channel environment is a single path environment or a near delay path environment in which all paths are allowed to be included in the passband of the interpolation filter having the first band, based on the quality of the first distortion-corrected signal that is the OFDM signal whose distortion has been corrected by using the first all-subcarrier channel characteristic and the quality of the second distortion-corrected signal that is the OFDM signal whose distortion has been corrected by using the second all-subcarrier channel characteristic.

The embodiments of the present invention allow making of a high-precision determination as to whether or not the channel environment is a single path environment or a near delay path environment.

BRIEF DESCRIPTION OF THE DRAWINGS

FIG. 30 is a block diagram showing a configuration example of a computer.

DETAILED DESCRIPTION OF THE PREFERRED EMBODIMENTS

1. First Embodiment

Configuration Example of Receiver

Figure 6:
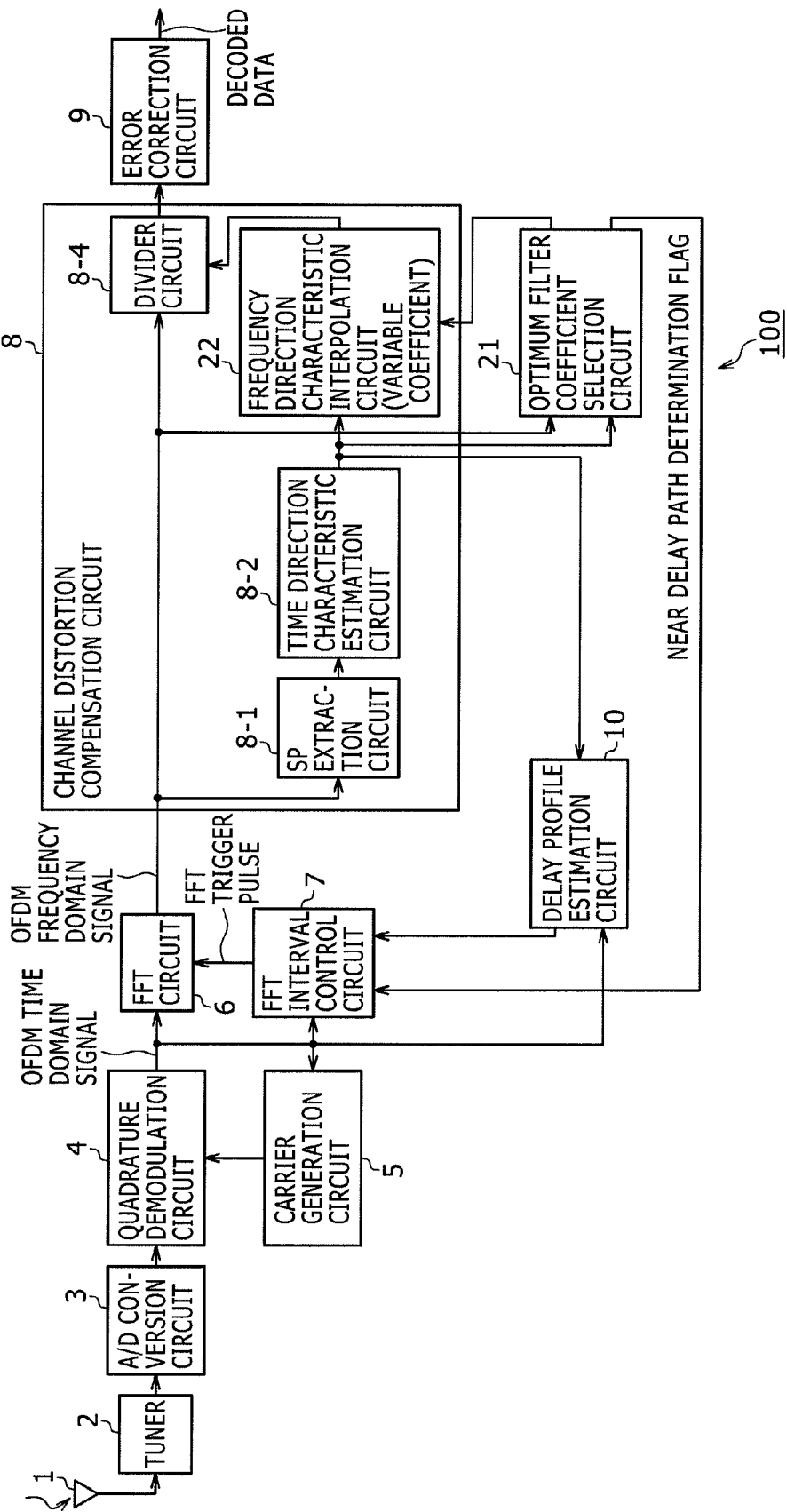
FIG. 6 is a block diagram showing a configuration example of a receiver according to one embodiment of the present invention.

FIG. 6 is a block diagram showing a configuration example of a receiver 100 according to one embodiment of the present invention.

Figure 3:
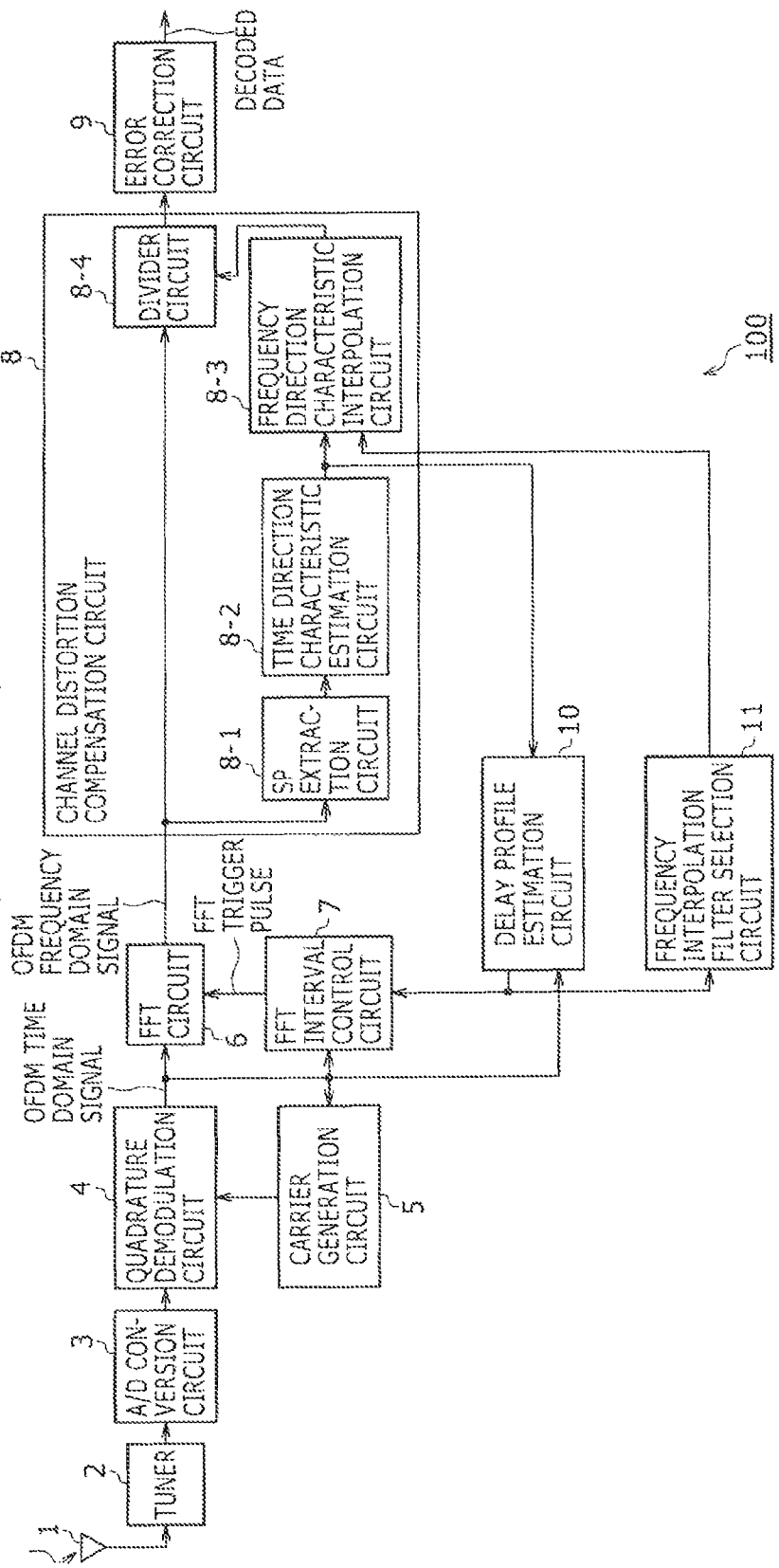
FIG. 3 is a block diagram showing a configuration example of an OFDM receiver of a related art.
Figure 4:
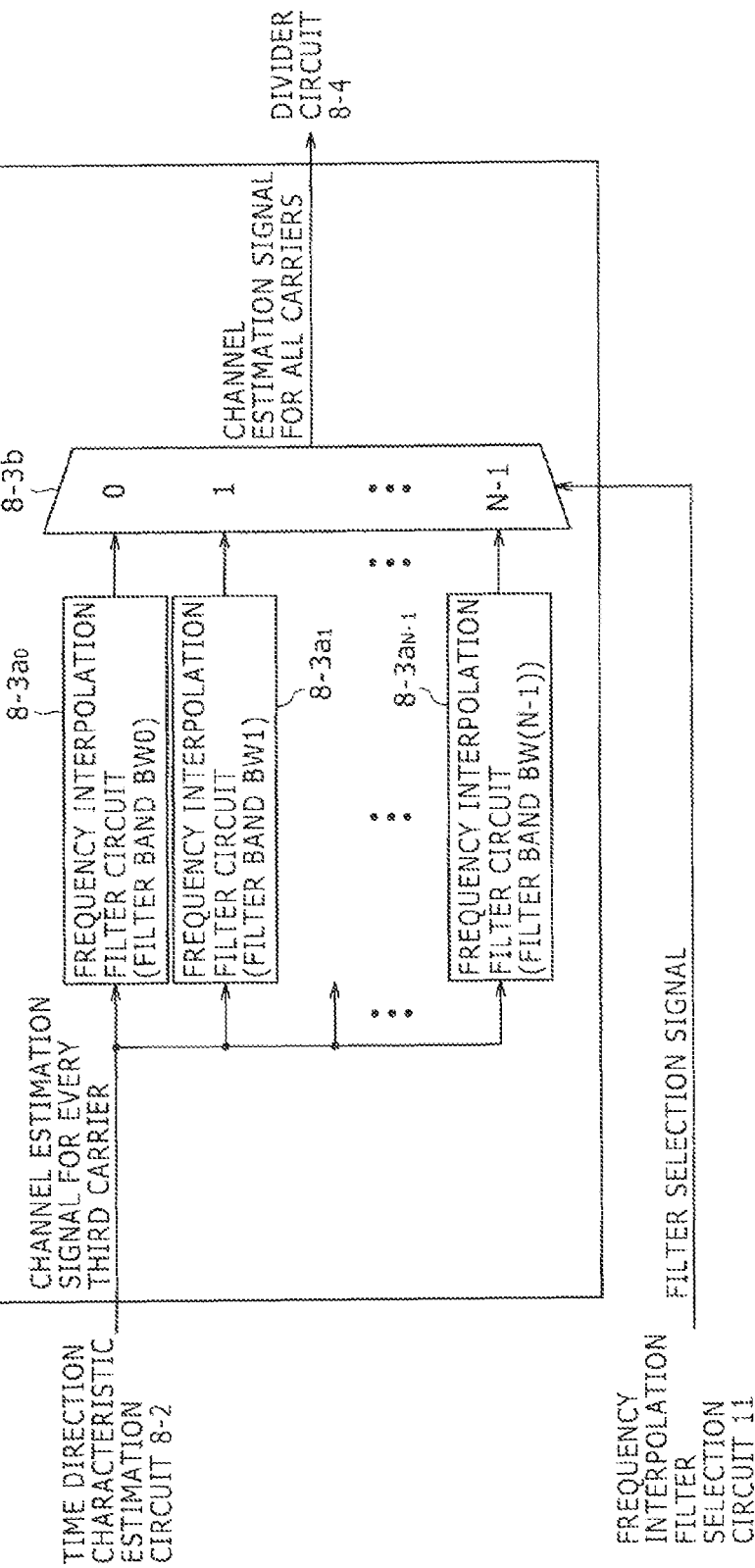
FIG. 4 is a diagram showing a configuration example of a frequency direction characteristic interpolation circuit in FIG. 3.

Of the components shown in FIG. 6, the same components as those in FIG. 3 are given the same numerals. Overlapping description is accordingly omitted.

The configuration of the receiver 100 of FIG. 6 is different from the configuration of FIG. 3 mainly in that an optimum filter coefficient selection circuit 21 is provided instead of the frequency interpolation filter selection circuit 11. Furthermore, as a circuit for executing frequency interpolation processing, a frequency direction characteristic interpolation circuit 22 that changes characteristics such as the band of an interpolation filter based on a coefficient supplied from the optimum filter coefficient selection circuit 21 and executes the frequency interpolation processing is provided in the channel distortion compensation circuit 8.

The receiver 100 of FIG. 6 employs not a method of controlling the interpolation filter used in the frequency interpolation processing based on a delay profile but a method of carrying out trials of the frequency interpolation processing with use of plural interpolation filters and controlling the interpolation filter that is actually used.

From the characteristics of the quality of the signal obtained through the trials of the frequency interpolation processing, a determination is made as to whether or not the channel environment is an environment including only a single path as the main path or an environment including only a near delay path as the path other than the main path. The interpolation filter is controlled based on the determination result. The result of the determination as to whether or not the channel environment is an environment including only a single path as the main path or an environment including only a near delay path as the path other than the main path is used also in FFT operation.

Hereinafter, if there is no need to distinguish the single path environment including only a single path as the main path from the near delay path environment including only a near delay path as the path other than the main path, description will be so made accordingly that the near delay path environment encompasses the single path environment. A near delay path determination to be described later is a determination as to whether or not the channel environment is a single path environment or a near delay path environment.

The tuner 2 carries out frequency conversion of an RF signal received by the receiving antenna 1 into an IF signal and outputs the IF signal to the A/D conversion circuit 3.

The A/D conversion circuit 3 executes A/D conversion for the IF signal and outputs the digital IF signal to the quadrature demodulation circuit 4.

The quadrature demodulation circuit 4 performs quadrature demodulation by using a carrier supplied from the carrier generation circuit 5 to thereby acquire an OFDM time domain signal and output it.

The carrier generation circuit 5 generates a carrier having predetermined frequency and outputs it to the quadrature demodulation circuit 4.

The FFT circuit 6 accordingly applies a window function in accordance with control by the FFT interval control circuit 7 and sets the FFT interval based on an FFT trigger pulse supplied from the FFT interval control circuit 7. Furthermore, the FFT circuit 6 performs the FFT operation for the OFDM time domain signal in the FFT interval. The FFT circuit 6 outputs an OFDM frequency domain signal that is extracted by the FFT operation and represents the data carried by the quadrature modulation of the respective subcarriers to the SP extraction circuit 8-1, the divider circuit 8-4, and the optimum filter coefficient selection circuit 21.

The FFT interval control circuit 7 controls the FFT operation by the FFT circuit 6 based on a near delay path determination flag supplied from the optimum filter coefficient selection circuit 21 and a delay profile estimated by the delay profile estimation circuit 10. The near delay path determination flag indicates whether or not the channel environment is a near delay path environment.

Figure 7:
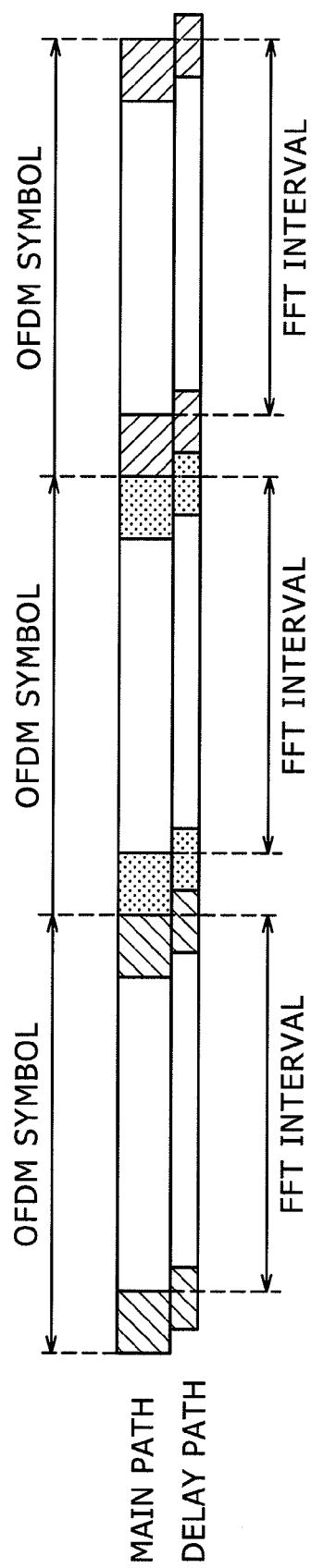
FIG. 7 is a diagram showing an example of control of FFT operation.

FIG. 7 is a diagram showing an example of the control of the FFT operation when the channel environment is not a near delay path environment.

A main path and a delay path are shown in FIG. 7. This delay path is a path that has a large delay amount with respect to the main path and therefore is not a near delay path.

In this case, as shown in FIG. 7, the FFT interval whose start position is the same as the end position of the GI in the main path is set for each OFDM symbol based on the FFT trigger pulse, and the FFT operation is performed by the FFT circuit 6 for the signal in the FFT interval. The FFT operation is performed except for the GI part.

Figure 8:
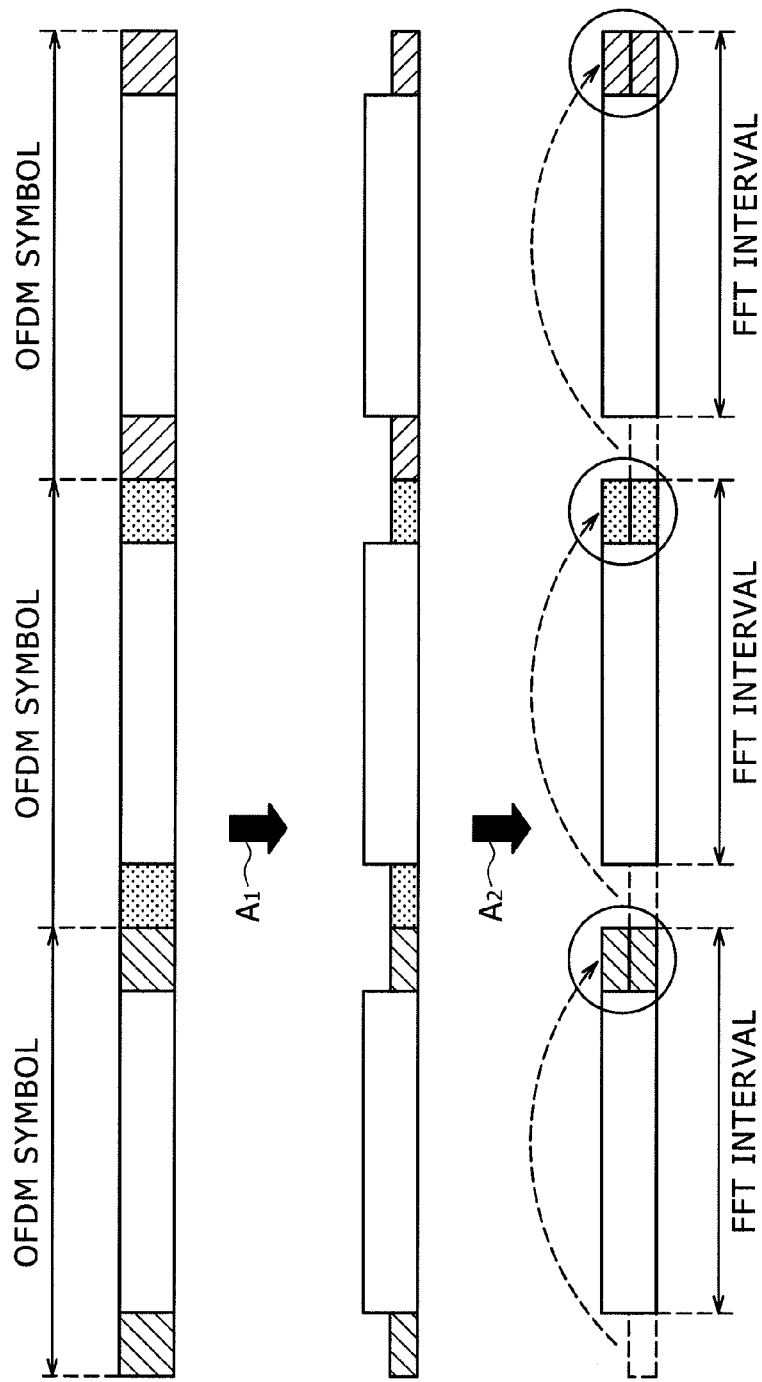
FIG. 8 is a diagram showing another example of the control of the FFT operation.

FIG. 8 is a diagram showing an example of the control of the FFT operation when the channel environment is a single path environment and therefore it is determined that the channel environment is a near delay path environment.

Only a main path is shown on the uppermost row in FIG. 8. In this case, a window function is applied to the OFDM time domain signal by the FFT circuit 6 in accordance with control by the FFT interval control circuit 7. As a result, as shown by arrowhead $A_1$ in FIG. 8, the amplitude of the signal of the GI and the signal of the interval as the copy source for the GI is halved. Furthermore, as shown by arrowhead $A_2$, the signal of the GI having the halved amplitude is added to the signal of the interval as the copy source for the GI, having the halved amplitude.

For the addition-result signal shown on the lowermost row in FIG. 8, e.g. the FFT interval whose start position is the same as the end position of the GI in the main path is set based on the FFT trigger pulse, and the FFT operation is performed for the signal in the FFT interval. For example, the end position of the GI in the main path is specified based on the estimated delay profile.

Through this processing, the GI is effectively utilized and the S/N ratio of the interval as the copy source for the GI is enhanced.

The precision of the near delay path determination by the optimum filter coefficient selection circuit 21 is higher than that of the environment determination based on the estimated delay profile. Accordingly, the GI can be effectively utilized with high precision and the signal quality can be enhanced.

Referring back to FIG. 6, the SP extraction circuit 8-1 in the channel distortion compensation circuit 8 extracts SP signals from the OFDM frequency domain signal and estimates the channel characteristic for the SP signals. The SP extraction circuit 8-1 outputs channel characteristic data representing the estimated channel characteristic to the time direction characteristic estimation circuit 8-2.

The time direction characteristic estimation circuit 8-2 estimates the channel characteristic for the respective OFDM symbols arranged along the time direction from the subcarrier in which the SP signal is disposed. The time direction characteristic estimation circuit 8-2 outputs time direction characteristic estimation data as data representing the estimated channel characteristic of every third subcarrier to the optimum filter coefficient selection circuit 21, the frequency direction characteristic interpolation circuit 22, and the delay profile estimation circuit 10.

The frequency direction characteristic interpolation circuit 22 changes the band of the interpolation filter and its center position based on the coefficient supplied from the optimum filter coefficient selection circuit 21, and executes the frequency interpolation processing.

Figure 9:
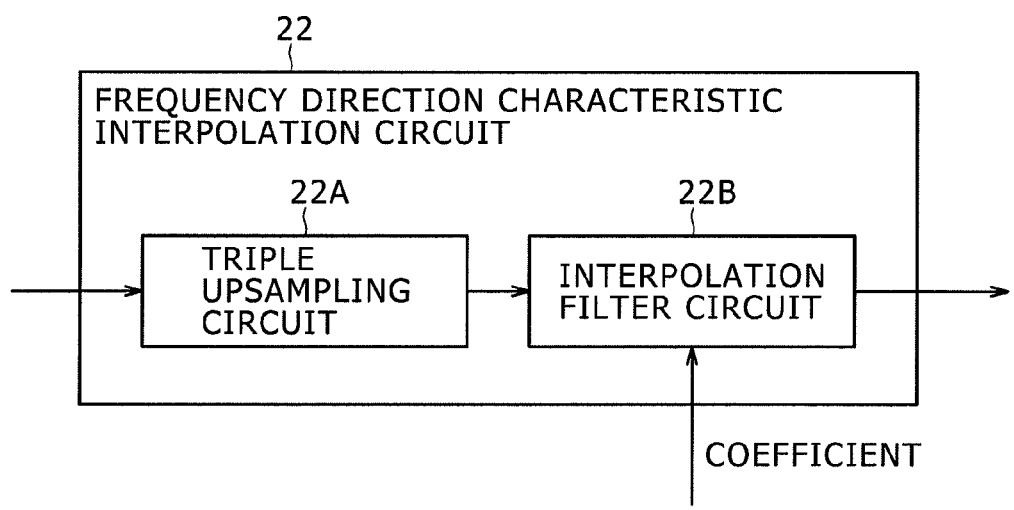
FIG. 9 is a diagram showing a configuration example of a frequency direction characteristic interpolation circuit in FIG. 6.

FIG. 9 is a diagram showing a configuration example of the frequency direction characteristic interpolation circuit 22.

As shown in FIG. 9, the frequency direction characteristic interpolation circuit 22 includes a triple upsampling circuit 22A and an interpolation filter circuit 22B.

The triple upsampling circuit 22A interpolates e.g. two zeros as new sample values between the sample values of the time direction characteristic estimation data supplied from the time direction characteristic estimation circuit 8-2. The triple upsampling circuit 22A outputs, to the interpolation filter circuit 22B, the time direction characteristic estimation data resulting from the increase in the number of sample values by a factor of three times that in the original data.

The interpolation filter circuit 22B is composed of a low pass filter (LPF) for filtering for interpolation of the channel characteristic in the frequency direction, and carries out filtering of the time direction characteristic estimation data from the triple upsampling circuit 22A. Adjustment is made based on the coefficient supplied from the optimum filter coefficient selection circuit 21 as to which of a wide band and a narrow band is employed as the band of the LPF (interpolation filter) used in the filtering and the center position of the band.

The interpolation filter circuit 22B carries out the filtering by using a wideband filter or a narrowband filter as the interpolation filter to thereby remove the fold-back component arising in the time direction characteristic estimation data due to the interpolation of the zeros and obtain the channel characteristic resulting from the interpolation in the frequency direction. The interpolation filter circuit 22B outputs, to the divider circuit 8-4, the channel characteristic resulting from the interpolation in the frequency direction, i.e. frequency direction characteristic interpolation data as data representing the channel characteristic of all of the subcarriers.

Figure 5:
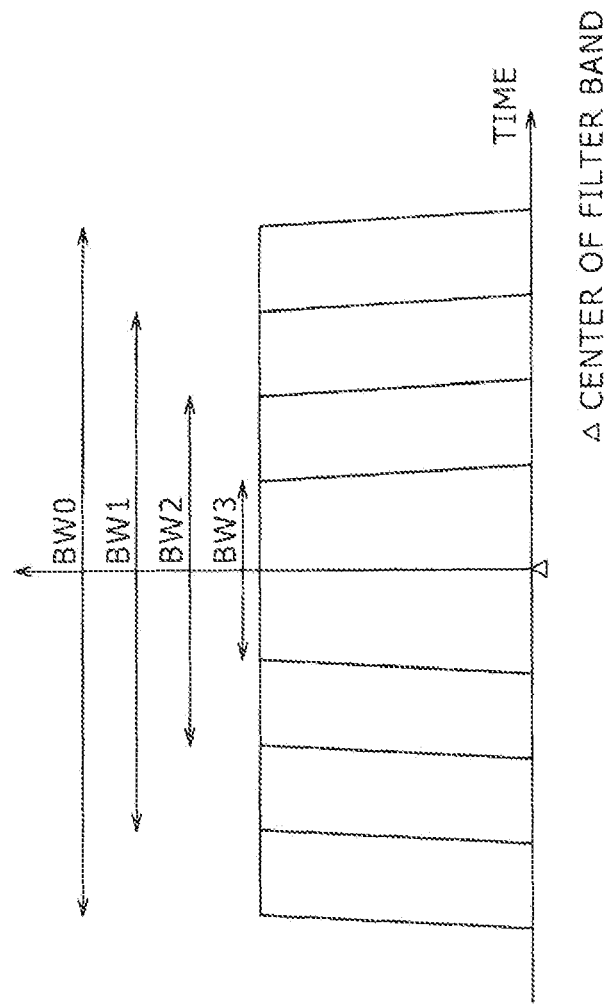
FIG. 5 is a diagram showing filter bands.

When the band of the interpolation filter is shown on the time axis as shown in FIG. 5, a band equivalent to about Tu/3 [seconds] is used as the band of the wideband filter for example. As the band of the narrowband filter, a band equivalent to about Tu/12 [seconds], narrower than the band of the wideband filter, is used.

A description will be made below about Tu/3 used as the band of the wideband filter.

Figure 10:
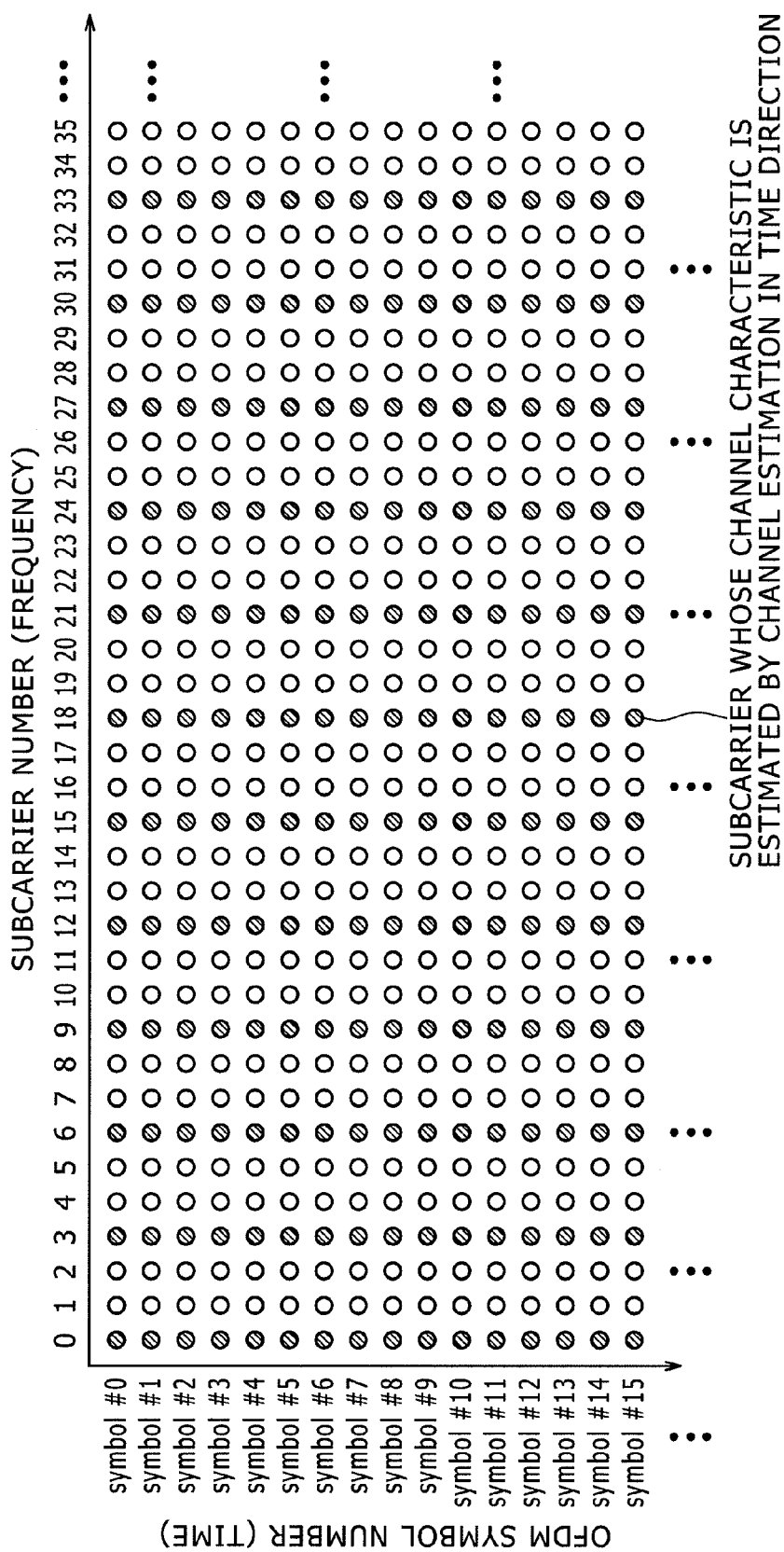
FIG. 10 is a diagram showing time direction characteristic estimation data.

FIG. 10 is a diagram showing time direction characteristic estimation data.

Figure 1:
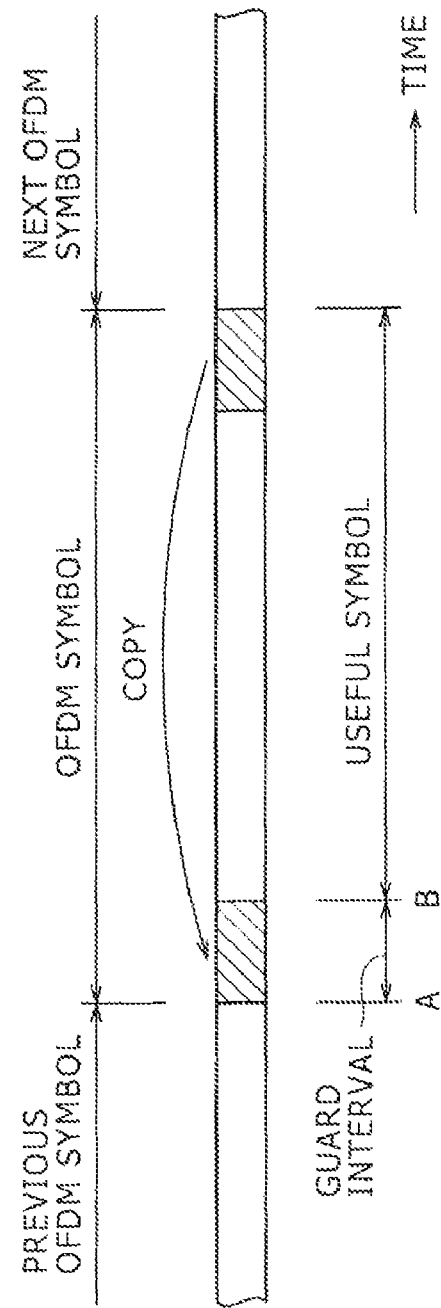
FIG. 1 is a diagram showing OFDM symbols.
Figure 2:
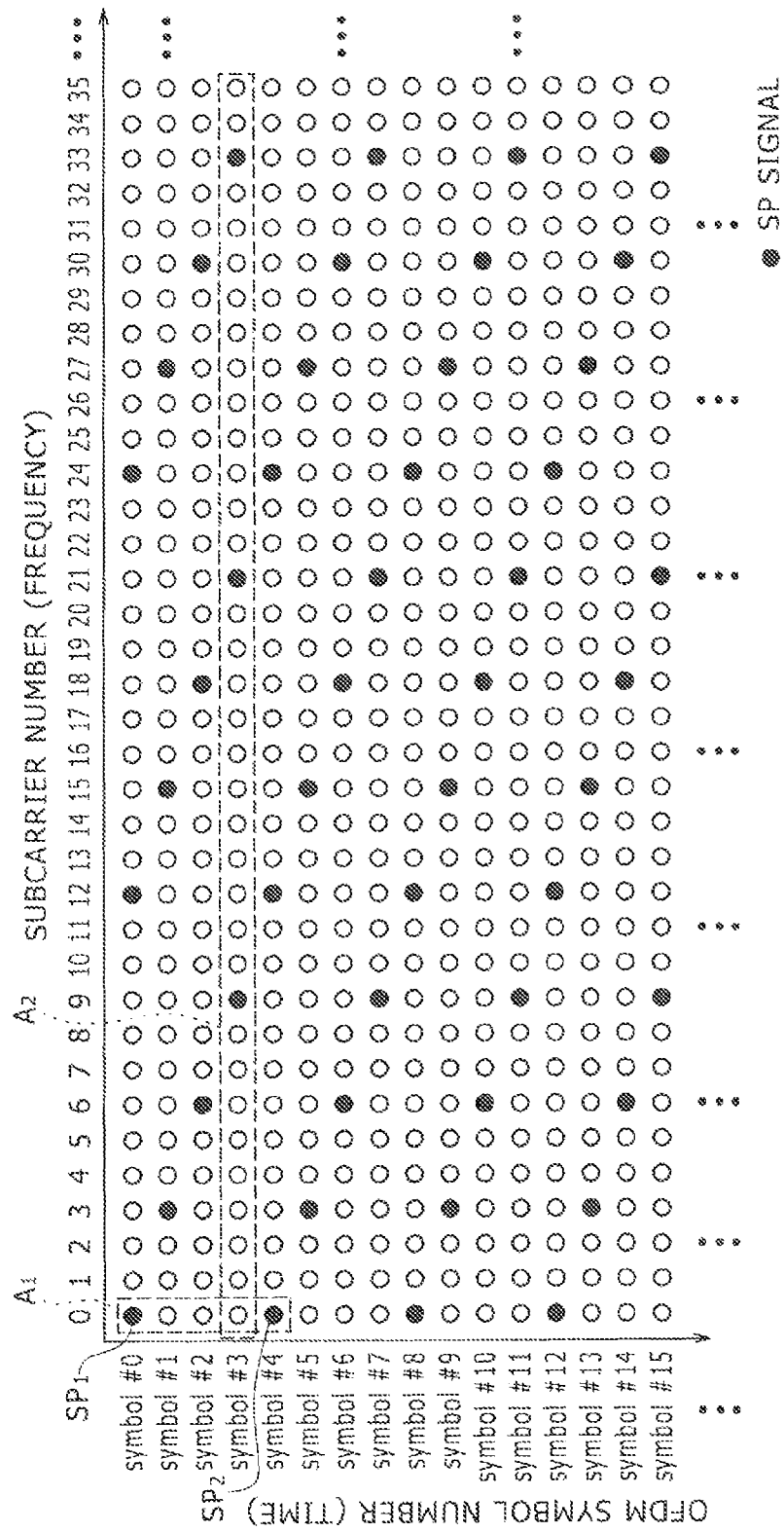
FIG. 2 is a diagram showing an arrangement pattern of SP signals.

Time direction characteristic estimation data like that shown in FIG. 10 is obtained by the time direction characteristic estimation circuit 8-2 by using the channel characteristic data for the SP signals arranged as shown in FIG. 2. In FIG. 10, the white circles and the hatched circles indicate subcarriers (transmission symbols) of OFDM signals. Furthermore, in FIG. 10, the hatched circles indicate the transmission symbols whose channel characteristic has been estimated through the processing in the time direction characteristic estimation circuit 8-2.

By the estimation of the channel characteristic in the time direction with use of the channel characteristic data for the SP signals, the channel characteristic for each OFDM symbol is obtained for every third subcarrier as shown in FIG. 10. The time direction characteristic estimation data representing the channel characteristic like that shown in FIG. 10 is supplied from the time direction characteristic estimation circuit 8-2 to the frequency direction characteristic interpolation circuit 22.

Figure 11:
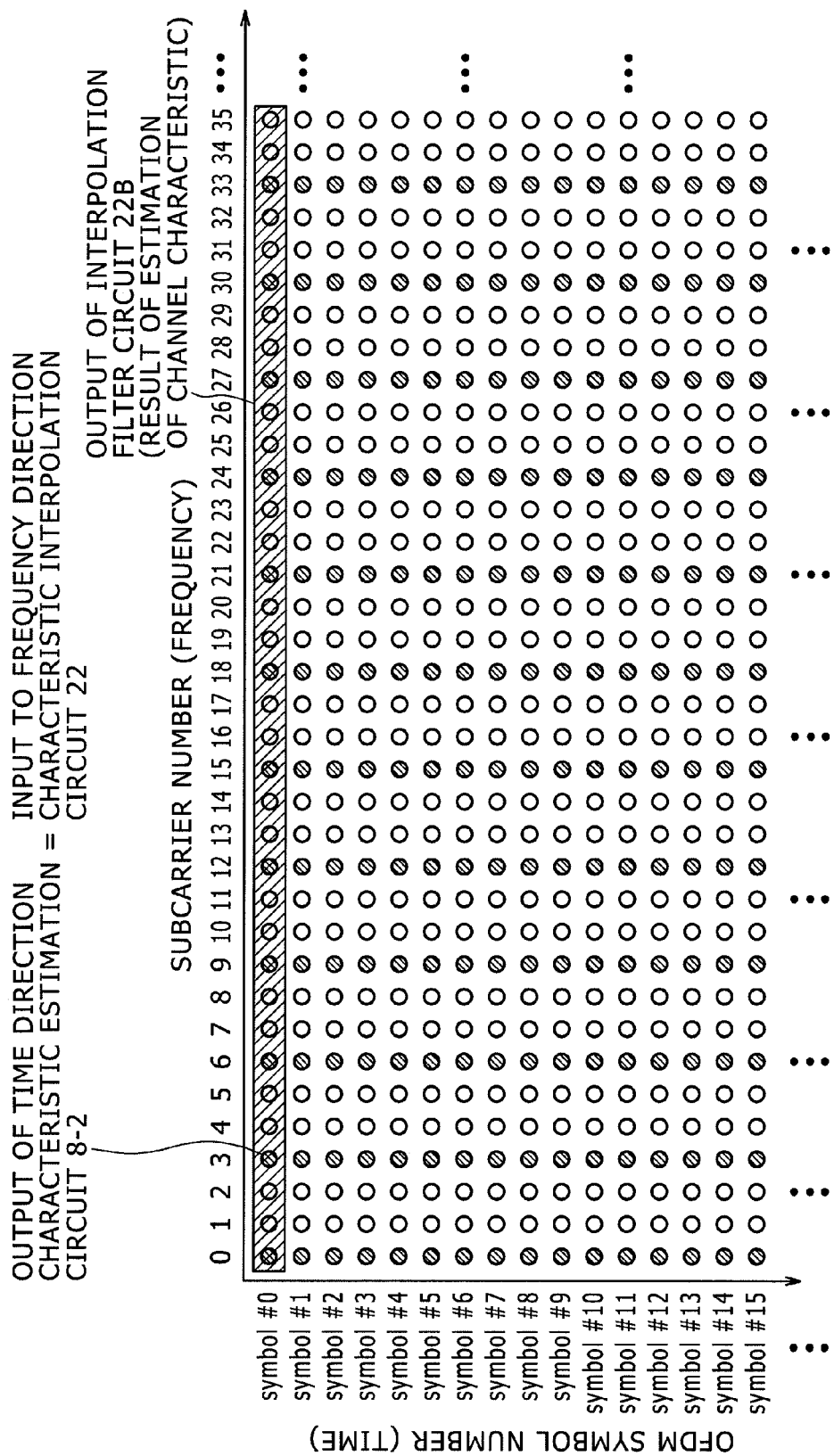
FIG. 11 is a diagram showing frequency direction characteristic interpolation data.

FIG. 11 is a diagram showing frequency direction characteristic interpolation data.

The frequency direction characteristic interpolation circuit 22 obtains the channel characteristic of each of the subcarriers of the OFDM symbol surrounded by the hatched area in FIG. 11 by using the time direction characteristic estimation data representing the channel characteristic of every third subcarrier along the subcarrier number direction.

Specifically, the triple upsampling circuit 22A interpolates two zeros between the sample values of the time direction characteristic estimation data to thereby create the time direction characteristic estimation data whose data amount is increased by a factor of three times that of the original data.

The time direction characteristic estimation data input to the triple upsampling circuit 22A is a sequence of the sample value representing the channel characteristic of every third subcarrier like that shown in FIG. 10. Therefore, in this time direction characteristic estimation data, two subcarriers whose channel characteristic is yet to be estimated exist between the subcarriers whose channel characteristic has been estimated. Therefore, the triple upsampling circuit 22A interpolates two zeros serving as the sample points of the channel characteristic for two subcarriers whose channel characteristic is yet to be estimated.

The number of interpolated zeros differs depending on the interval of the subcarriers whose channel characteristic is estimated in the time direction characteristic estimation data obtained by the time direction characteristic estimation circuit 8-2.

If two zeros are interpolated between the sample values of the time direction characteristic estimation data in this manner, the time direction characteristic estimation data obtained as a result of the interpolation includes a fold-back component in the time domain. Hereinafter, the time direction characteristic estimation data resulting from the interpolation of zero will be referred to as the zero-value interpolation characteristic data accordingly.

The reason why the time direction characteristic estimation data includes the fold-back component will be described below. The time direction characteristic estimation data is data obtained from an OFDM frequency domain signal and thus data in the frequency domain.

The time direction characteristic estimation data and the zero-value interpolation characteristic data obtained by interpolating zero in this time direction characteristic estimation data are the same signal as an analog signal. The time domain data of the time direction characteristic estimation data and the time domain data of the zero-value interpolation characteristic data have the identical frequency component.

The time direction characteristic estimation data is a sequence of the sample value representing the channel characteristic of every third subcarrier. The interval between the subcarriers is Fc=1/Tu [Hz] as described above. Therefore, the interval between the sample values in the time direction characteristic estimation data as a sequence of the sample value representing the channel characteristic of every third subcarrier is 3Fc=3/Tu [Hz].

Accordingly, the interval between the sample values in the zero-value interpolation characteristic data obtained by interpolation of two zeros between the sample values in the time direction characteristic estimation data is Fc=1/Tu [Hz].

On the other hand, the time direction characteristic estimation data in which the interval between the sample values is 3Fc=3/Tu [Hz] is data whose one cycle is ⅓Fc=Tu/3 [seconds] in the time domain.

The zero-value interpolation characteristic data in which the interval between the sample values is Fc=1/Tu [Hz] is data whose one cycle is 1/Fc=Tu [seconds], i.e. data whose one cycle is three times that of the time direction characteristic estimation data, in the time domain.

As above, the time domain data of the zero-value interpolation characteristic data, which has the same frequency component as that of the time domain data of the time direction characteristic estimation data and whose one cycle is three times that of the time domain data of the time direction characteristic estimation data, is data obtained by repeating the time domain data of the time direction characteristic estimation data three times.

Figure 12:
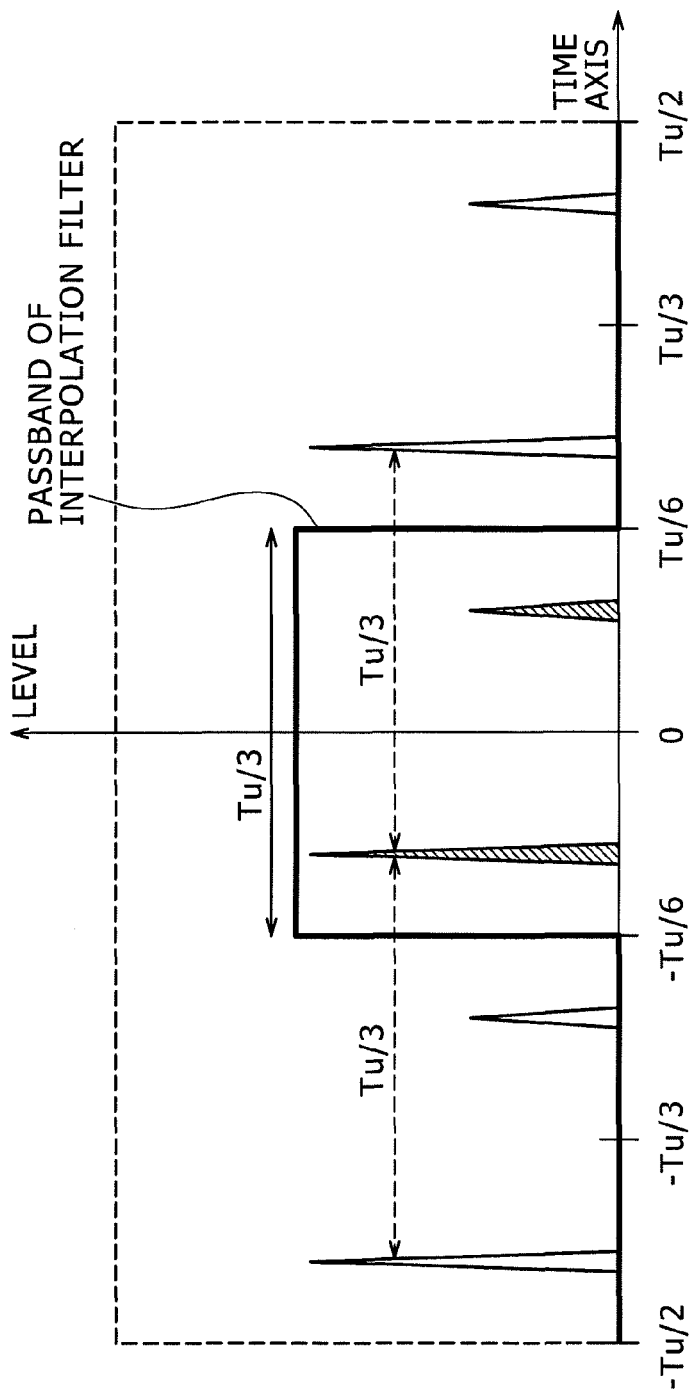
FIG. 12 is a diagram showing an example of the time domain data of zero-value interpolation characteristic data.

FIG. 12 is a diagram showing an example of the time domain data of zero-value interpolation characteristic data.

In the example of FIG. 12, there are two paths: a main path and a delay path. In FIG. 12, the abscissa indicates the time and the ordinate indicates the power level of the path.

The zero-value interpolation characteristic data whose cycle is Tu [seconds] is, in the time domain, equivalent to data obtained by three repetitions of the multipath corresponding to time direction characteristic estimation data whose cycle is Tu/3 [seconds].

When the center multipath that is hatched in FIG. 12 is desired to be extracted as frequency direction characteristic interpolation data, the other multipaths need to be removed in order to obtain the desired multipath corresponding to the frequency direction characteristic interpolation data.

To meet this need, the interpolation filter circuit 22B carries out filtering of the zero-value interpolation characteristic data to thereby remove the multipaths other than the desired multipath so as to extract the desired multipath corresponding to the frequency direction characteristic interpolation data.

The zero-value interpolation characteristic data is frequency domain data. The filtering of the zero-value interpolation characteristic data in the interpolation filter circuit 22B is equivalent to convolution between the filter coefficient of the interpolation filter and the zero-value interpolation characteristic data, which is frequency domain data.

The convolution in the frequency domain is equivalent to multiplication by a window function in the time domain. Therefore, the filtering of the zero-value interpolation characteristic data can be expressed as multiplication of the zero-value interpolation characteristic data by the window function corresponding to the passband of the interpolation filter circuit 22B in the time domain. The window function indicated by the heavy line in FIG. 12 represents the function that is used in the multiplication as the filtering of the zero-value interpolation characteristic data and corresponds to the passband of the interpolation filter circuit 22B.

The cycle of the multipath that is repeated three times is Tu/3 [seconds]. Therefore, by using, as the interpolation filter, e.g. an LPF whose passband is the band in the range of −Tu/6 to +Tu/6, whose bandwidth is equal to the cycle Tu/3 [seconds] of the multipath that is repeated three times, the desired multipath corresponding to the frequency direction characteristic interpolation data can be extracted.

The Tu/3, which is the bandwidth of the wideband filter used as the interpolation filter in the interpolation filter circuit 22B, depends on the interval of subcarriers whose channel characteristic can be obtained in the estimation of the channel characteristic in the time direction.

The interpolation filter circuit 22B outputs the estimation result of the channel characteristic of all of the subcarriers, estimated by the frequency interpolation processing, to the divider circuit 8-4 in FIG. 6.

The divider circuit 8-4 carries out equalization by correcting distortion included in the OFDM frequency domain signal based on the channel characteristic of all of the subcarriers, supplied from the frequency direction characteristic interpolation circuit 22. The divider circuit 8-4 outputs the OFDM frequency domain signal whose distortion has been corrected to the error correction circuit 9.

The distortion that is received by the OFDM signal on the channel and is attributed to multipath and so on is equivalent to multiplication of the OFDM signal. The correction of the distortion received by the OFDM signal on the channel is realized by dividing the actually received OFDM signal by the channel characteristic.

The error correction circuit 9 outputs the data obtained through the various kinds of processing to the subsequent-stage circuit as decoded data.

The delay profile estimation circuit 10 estimates the delay profile of the channel and outputs the delay profile to the FFT interval control circuit 7.

The optimum filter coefficient selection circuit 21 shifts the center position of the band of each of the wideband filter and the narrowband filter, and carries out trials of frequency interpolation processing under plural conditions by using the interpolation filter whose center position is shifted. The wideband filter and the narrowband filter used by the optimum filter coefficient selection circuit 21 each have the same bandwidth as that of the wideband filter and the narrowband filter used in the frequency interpolation processing in the frequency direction characteristic interpolation circuit 22.

Furthermore, the optimum filter coefficient selection circuit 21 corrects the distortion of the OFDM frequency domain signal supplied from the FFT circuit 6 based on the channel characteristic of all of the subcarriers, obtained through the trials of the frequency interpolation processing under the respective conditions. The optimum filter coefficient selection circuit 21 calculates the quality of each of the OFDM frequency domain signals whose distortion has been corrected.

The optimum filter coefficient selection circuit 21 determines the condition under which the best quality is obtained, and outputs, to the frequency direction characteristic interpolation circuit 22, the coefficient representing the interpolation filter (the wideband filter or the narrowband filter) used in this condition and the center position of the band of the interpolation filter.

If the interpolation filter used in the condition under which the best quality is obtained is the narrowband filter, the optimum filter coefficient selection circuit 21 determines that the channel environment is a near delay path environment and outputs a near delay path determination flag indicating this to the FFT interval control circuit 7.

In the optimum filter coefficient selection circuit 21, the interpolation filter and its center position that can offer the signal having the best quality, and the result of the near delay path determination are obtained e.g. on a symbol-by-symbol basis.

The near delay path determination made by use of the narrowband filter and the wideband filter will be described below.

FIGS. 13A to 13D are diagrams for description about the center position of the interpolation filter and the signal quality of the OFDM frequency domain signal whose distortion has been corrected. In the diagrams, the horizontal direction corresponds to the time direction and the vertical direction corresponds to the power of a path.

Figure 13A:
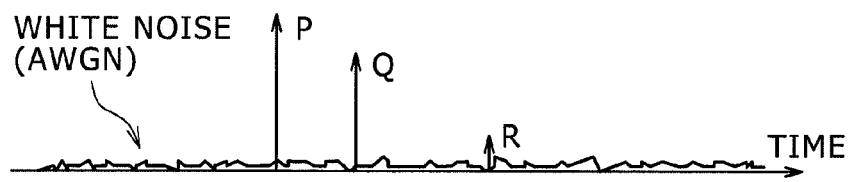
FIGS. 13A to 13D are diagrams for explaining the signal quality of an OFDM frequency domain signal.

FIG. 13A is a diagram showing an example of the profile of a received signal. In this example, three paths P, Q, and R exist.

Figure 13B:
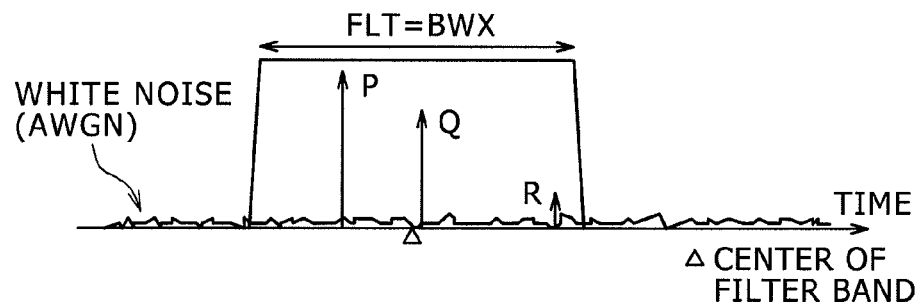

If the interpolation filter is so applied that all of the paths are included in the band of the interpolation filter as shown in FIG. 13B, the quality of the finally-obtained OFDM frequency domain signal after the distortion correction is high. The upward white triangle indicates the center position of the band of the interpolation filter.

Figure 13C:
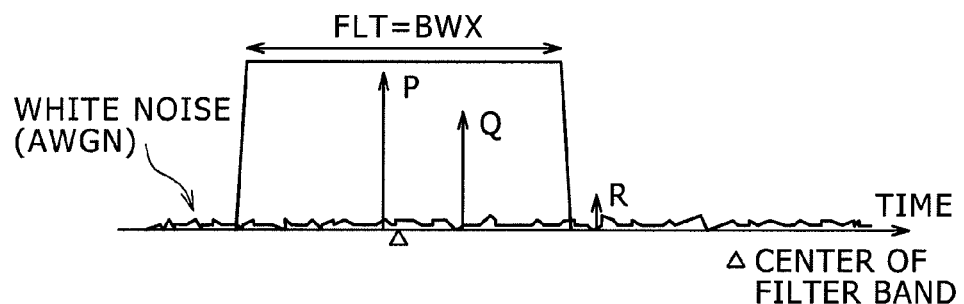
Figure 13D:
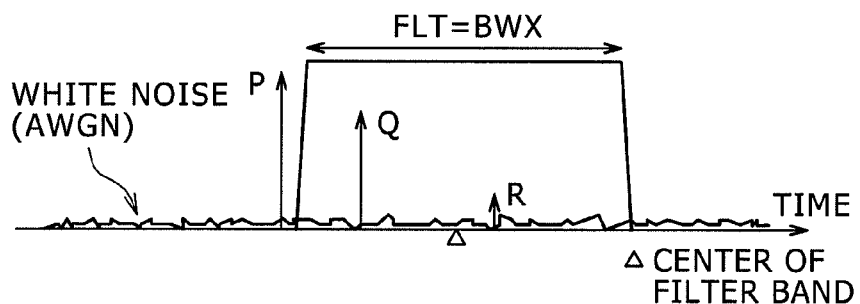

On the other hand, if the interpolation filter is so applied that part of the paths is not included in the band of the interpolation filter as shown in FIGS. 13C and 13D, the quality of the finally-obtained OFDM frequency domain signal after the distortion correction is lower than that in the case of FIG. 13B, in which the interpolation filter is so applied that all of the paths are included in the band.

Figure 14A:
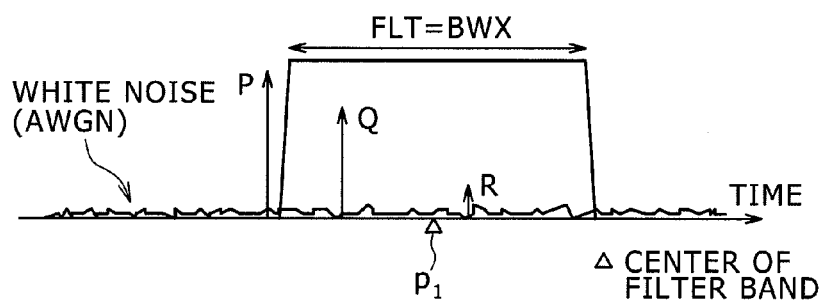
FIGS. 14A and 14B are diagrams for explaining change in the signal quality dependent on the filter band center.
Figure 14B:
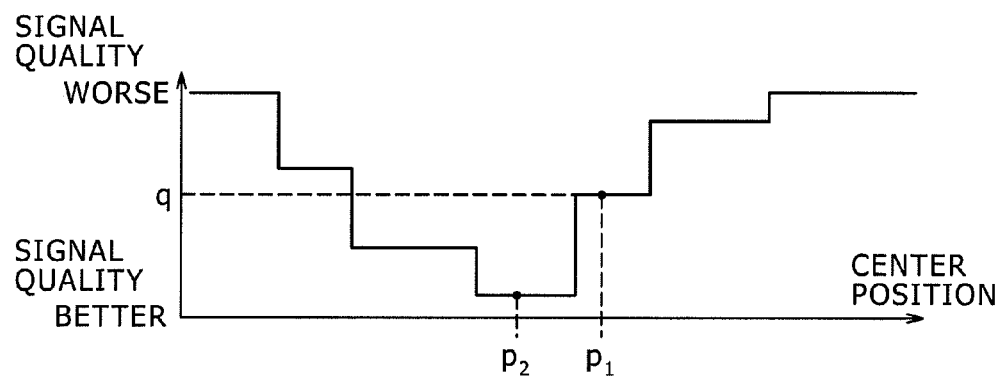

If the signal quality obtained at the respective timings with change in the center position of the interpolation filter for sequentially shifting the band in this manner is represented as a graph, a graph like that shown in FIG. 14B is obtained. The abscissa of the graph of FIG. 14B indicates the center position of the interpolation filter, and the ordinate indicates the signal quality. A value on the upper side indicates worse quality, and a value on the lower side indicates better quality.

When the center position of the band of the interpolation filter exists at a position $p_1$ shown in FIG. 14A, the quality of the OFDM frequency domain signal whose distortion has been corrected by using the channel characteristic obtained through the frequency interpolation processing is represented as quality q as shown in FIG. 14B.

Because the path P is not included in the band of the interpolation filter, the quality q obtained in this case is worse, by the degree corresponding to the power of the path P, than the quality obtained when the center position of the band is located at e.g. a position $p_2$ so that all of the paths may be included in the band.

As shown in FIG. 14A, white noise exists over the entire range. Therefore, the range of the center position that allows the band to include all of three paths in FIG. 14A does not correspond with the range of the center position that offers the best quality in the graph of FIG. 14B.

Figure 15A:
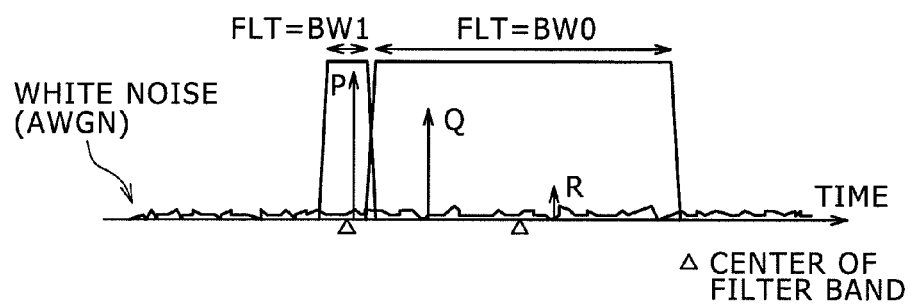
FIGS. 15A and 15B are diagrams for explaining change in the signal quality dependent on the filter band center when the channel environment is not a single path environment.
Figure 15B:
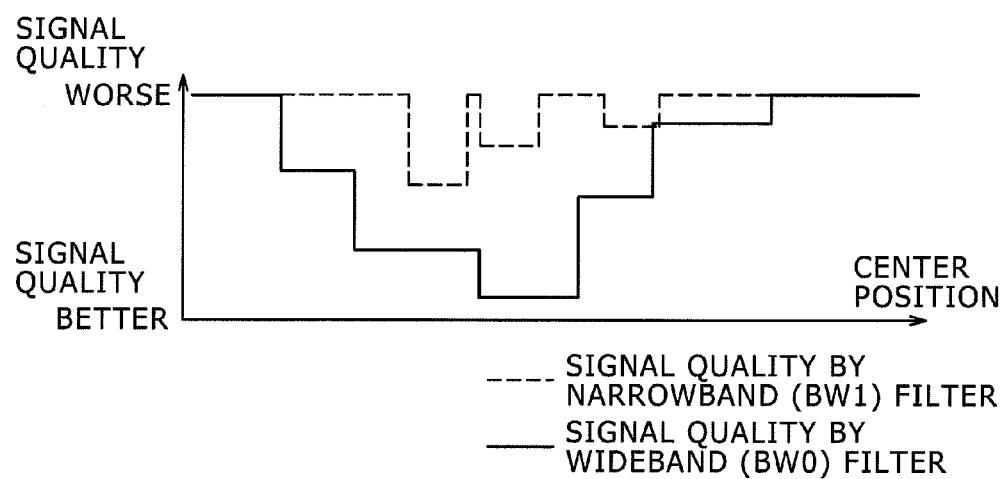

FIGS. 15A and 15B are diagrams in which the signal quality obtained with sequential change in the center position of the band of the narrowband filter and the signal quality obtained with sequential change in the center position of the band of the wideband filter are overlapped.

In the example of FIGS. 15A and 15B, the band of the narrowband filter is defined as BW1 and the band of the wideband filter is defined as BW0. All of three paths can be included in the band of the wideband filter depending on the center position of the band. However, not all of three paths can be included in the band of the narrowband filter irrespective of the center position of the band.

In the environment involving three paths, not all of the paths can be included in the band of the narrowband filter. Therefore, as shown in FIG. 15B, basically the signal quality obtained when the narrowband filter is used is worse than that obtained when the wideband filter is used. The solid line in FIG. 15B indicates the signal quality obtained when the wideband filter is used, and the dashed line indicates the signal quality obtained when the narrowband filter is used.

Figure 16A:
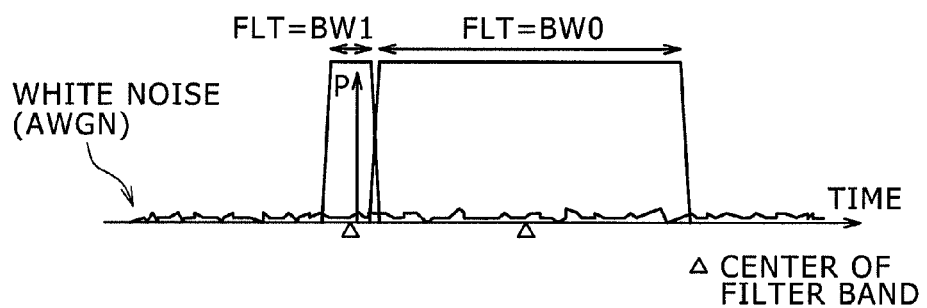
FIGS. 16A and 16B are diagrams for explaining change in the signal quality dependent on the filter band center when the channel environment is a single path environment.
Figure 16B:
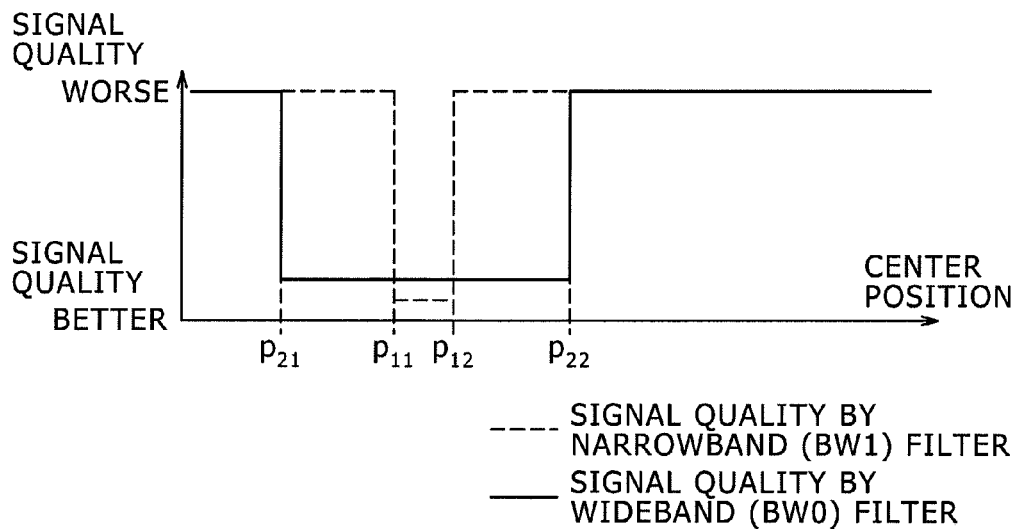

FIGS. 16A and 16B are diagrams in which, regarding a single path environment, the signal quality obtained with sequential change in the center position of the band of the narrowband filter and the signal quality obtained with sequential change in the center position of the band of the wideband filter are overlapped.

In a single path environment, all of the path (single path) can be included in the band of the narrowband filter depending on the center position of the band. Therefore, even when the narrowband filter is used, the OFDM frequency domain signal having good quality can be obtained.

According to the example of FIG. 16B, a path P is included in the band of the narrowband filter when the center position of the band exists in the range from a position $p_{11}$ to a position $p_{12}$. Furthermore, the path P is included in the band of the wideband filter when the center position of the band exists in the range from a position $p_{21}$ to a position $p_{22}$.

The signal quality obtained when the narrowband filter is used and the path P is included in its band is better than that obtained when the wideband filter is used and the path P is included in its band. The reason for this is that the amount of white noise included in the band is smaller when the narrowband filter is used.

Based on this feature, in the near delay path determination, it is determined that the channel environment is a near delay path environment if the best signal quality obtained when the narrowband filter is used is better than the best signal quality obtained when the wideband filter is used.

It is also possible that the center position of the band is also taken into consideration and it is determined that the channel environment is a near delay path environment if the range of the best signal quality when the narrowband filter is used falls within the range of the best signal quality when the wideband filter is used as shown in FIG. 16B.

On the other hand, it is determined that the channel environment is not a near delay path environment if the best signal quality obtained when the narrowband filter is used is not better than the best signal quality obtained when the wideband filter is used.

In the above-described determination, an environment involving a path whose delay spread with respect to the path P in FIG. 16A is so small that this path is included in the band of the narrowband filter together with the path P is also determined to be a near delay path environment because it is impossible to distinguish such an environment from a single path environment. The near delay path is a delay path whose delay spread is so small that this delay path is included in the band of the narrowband filter together with the main path depending on the center position of the band.

Figure 17:
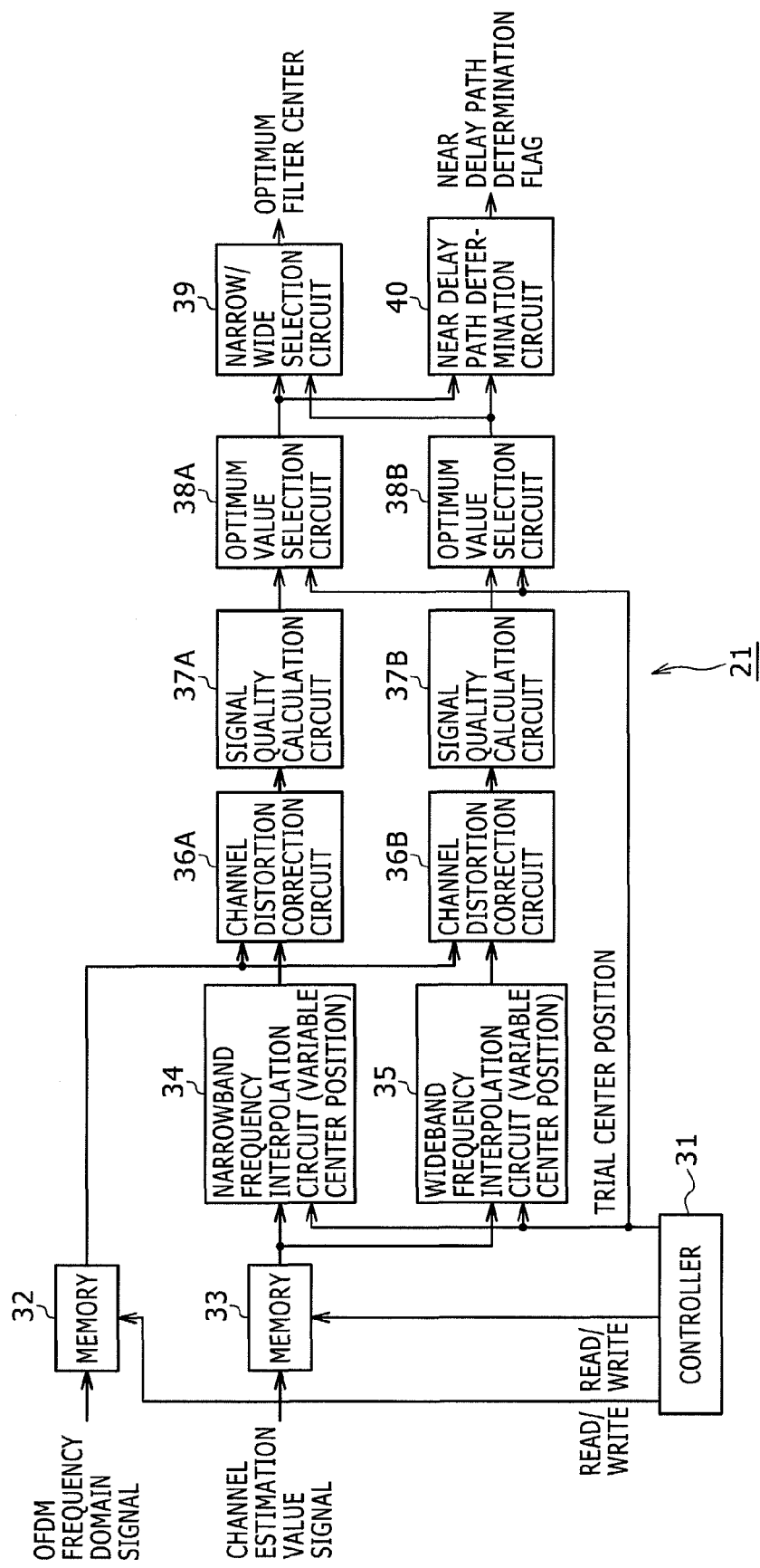
FIG. 17 is a diagram showing a configuration example of an optimum filter coefficient selection circuit in FIG. 6.

FIG. 17 is a diagram showing a configuration example of the optimum filter coefficient selection circuit 21, which makes the near delay path determination on the above-described principle and controls the interpolation filter used in the frequency direction characteristic interpolation circuit 22.

A controller 31 controls reading/writing from/to memories 32 and 33 so that data of the same symbol may be held therein and the held data of the same symbol may be read out therefrom. Furthermore, the controller 31 outputs a trial center position as the center position of the band of the interpolation filter for a trial to a narrowband frequency interpolation circuit 34, a wideband frequency interpolation circuit 35, and optimum value selection circuits 38A and 38B.

The memory 32 holds the OFDM frequency domain signal of one symbol, supplied from the FFT circuit 6, in accordance with control by the controller 31. The OFDM frequency domain signal of one symbol, held in the memory 32, is read out by channel distortion correction circuits 36A and 36B.

The memory 33 holds time direction characteristic estimation data of one symbol, as data representing the channel characteristic of every third subcarrier estimated by the time direction characteristic estimation circuit 8-2, in accordance with control by the controller 31. The time direction characteristic estimation data of one symbol, held in the memory 33, is read out by the narrowband frequency interpolation circuit 34 and the wideband frequency interpolation circuit 35.

The narrowband frequency interpolation circuit 34 has a configuration similar to that of the frequency direction characteristic interpolation circuit 22 in FIG. 9, and executes frequency interpolation processing by using a narrowband filter as the interpolation filter. Specifically, the narrowband frequency interpolation circuit 34 upsamples the sample values of the time direction characteristic estimation data to the triple sample values, and executes the frequency interpolation processing by using the narrowband filter whose band center position is adjusted in accordance with the trial center position supplied from the controller 31.

The narrowband frequency interpolation circuit 34 outputs the channel characteristic of all of the subcarriers, obtained by the frequency interpolation processing, to the channel distortion correction circuit 36A.

The wideband frequency interpolation circuit 35 also has a configuration similar to that of the frequency direction characteristic interpolation circuit 22 in FIG. 9, and executes frequency interpolation processing by using a wideband filter as the interpolation filter. The wideband frequency interpolation circuit 35 upsamples the sample values of the time direction characteristic estimation data to the triple sample values, and executes the frequency interpolation processing by using the wideband filter whose band center position is adjusted in accordance with the trial center position supplied from the controller 31.

The wideband frequency interpolation circuit 35 outputs the channel characteristic of all of the subcarriers, obtained by the frequency interpolation processing, to the channel distortion correction circuit 36B.

The narrowband frequency interpolation circuit 34 and the wideband frequency interpolation circuit 35 have functions as the interpolator.

The narrowband frequency interpolation circuit 34 and the wideband frequency interpolation circuit 35 execute the frequency interpolation processing for plural patterns with the sequential movement of the center position of the band of the interpolation filter by a predetermined width for each movement. The channel characteristics obtained by the frequency interpolation processing for the respective patterns are output therefrom. Whether or not a path is included in the band of the interpolation filter depends on the center position of the band as described above. Therefore, the channel characteristic obtained by the frequency interpolation processing accordingly varies by the trial center position, which is set by the controller 31.

Every time the channel characteristic is supplied from the narrowband frequency interpolation circuit 34 to the channel distortion correction circuit 36A, the channel distortion correction circuit 36A corrects channel distortion included in the OFDM frequency domain signal of one symbol, read out from the memory 32, based on the supplied channel characteristic. The channel distortion correction circuit 36A outputs the OFDM frequency domain signal whose distortion has been corrected to a signal quality calculation circuit 37A.

Every time the channel characteristic is supplied from the wideband frequency interpolation circuit 35 to the channel distortion correction circuit 36B, the channel distortion correction circuit 36B corrects channel distortion included in the OFDM frequency domain signal of one symbol, read out from the memory 32, based on the supplied channel characteristic. The channel distortion correction circuit 36B outputs the OFDM frequency domain signal whose distortion has been corrected to a signal quality calculation circuit 37B.

The channel distortion correction circuits 36A and 36B have functions as the distortion corrector.

Every time the OFDM frequency domain signal of one symbol is supplied from the channel distortion correction circuit 36A to the signal quality calculation circuit 37A, the signal quality calculation circuit 37A calculates the quality of the signal and outputs the calculated quality as a trial result to the optimum value selection circuit 38A.

For example, the signal quality calculation circuit 37A calculates the power of noise included in the OFDM frequency domain signal and outputs the calculated value. Because the quality is represented as the power of noise, a smaller value indicates better quality and a larger value indicates worse quality.

Every time the OFDM frequency domain signal of one symbol is supplied from the channel distortion correction circuit 36B to the signal quality calculation circuit 37B, the signal quality calculation circuit 37B calculates the quality of the signal and outputs the calculated quality as a trial result to the optimum value selection circuit 38B, similarly to the signal quality calculation circuit 37A.

The signal quality calculation circuits 37A and 37B have functions as the calculator.

The optimum value selection circuit 38A sequentially holds the quality calculated by the signal quality calculation circuit 37A. If the trials for all patterns are completed for the OFDM frequency domain signal of one symbol as the subject with change in the center position of the band of the narrowband filter, a trial result like that indicated by the dashed line in the graphs of FIGS. 15B and 16B is obtained in the optimum value selection circuit 38A.

After acquiring the trial result for all patterns, the optimum value selection circuit 38A selects the center position of the band of the narrowband filter, used to create the OFDM frequency domain signal having the best quality. The optimum value selection circuit 38A specifies which position offers the signal having the best quality as the center position of the band of the narrowband filter, for the OFDM frequency domain signal of one symbol as the subject.

The selection result by the optimum value selection circuit 38A is output as the optimum center position of the narrowband filter to a narrow/wide selection circuit 39 and a near delay path determination circuit 40. To the narrow/wide selection circuit 39 and the near delay path determination circuit 40, the quality of the trial result obtained when the optimum center position is employed as the center position of the band of the narrowband filter is also output.

The optimum value selection circuit 38B sequentially holds the quality calculated by the signal quality calculation circuit 37B. If the trials for all patterns are completed for the OFDM frequency domain signal of one symbol as the subject with change in the center position of the band of the wideband filter, a trial result like that indicated by the solid line in the graphs of FIGS. 15B and 16B is obtained in the optimum value selection circuit 38B.

After acquiring the trial result for all patterns, the optimum value selection circuit 38B selects the center position of the band of the wideband filter, used to create the OFDM frequency domain signal having the best quality. The optimum value selection circuit 38B specifies which position offers the signal having the best quality as the center position of the band of the wideband filter, for the OFDM frequency domain signal of one symbol as the subject.

The selection result by the optimum value selection circuit 38B is output as the optimum center position of the wideband filter to the narrow/wide selection circuit 39 and the near delay path determination circuit 40. To the narrow/wide selection circuit 39 and the near delay path determination circuit 40, the quality of the trial result obtained when the optimum center position is employed as the center position of the band of the wideband filter is also output.

The narrow/wide selection circuit 39 compares the quality supplied from the optimum value selection circuit 38A with the quality supplied from the optimum value selection circuit 38B, and selects the better quality and the supplied optimum center position. The narrow/wide selection circuit 39 employs the selected optimum center position as the optimum filter center, and outputs a coefficient representing the optimum filter center and the band (the narrowband filter or the wideband filter) whose center position is to be adjusted to the optimum filter center.

The coefficient output from the narrow/wide selection circuit 39 is supplied to the frequency direction characteristic interpolation circuit 22 and used in the frequency interpolation processing. For the frequency direction characteristic interpolation circuit 22, on a symbol-by-symbol basis, which of the wideband filter and the narrowband filter is used in the frequency interpolation processing is specified and the center position of the band of the filter is specified.

The near delay path determination circuit 40 makes the near delay path determination based on the principle described with reference to FIGS. 15 and 16 and outputs a near delay path determination flag indicating the determination result, based on the signal quality out of the center position and the signal quality supplied from the optimum value selection circuits 38A and 38B.

The near delay path determination flag output from the near delay path determination circuit 40 is supplied to the FFT interval control circuit 7 and used for the control of the FFT operation like that described with reference to FIGS. 7 and 8. For the FFT interval control circuit 7, whether or not the channel environment is a near delay path environment is specified on a symbol-by-symbol basis.

Figure 18:
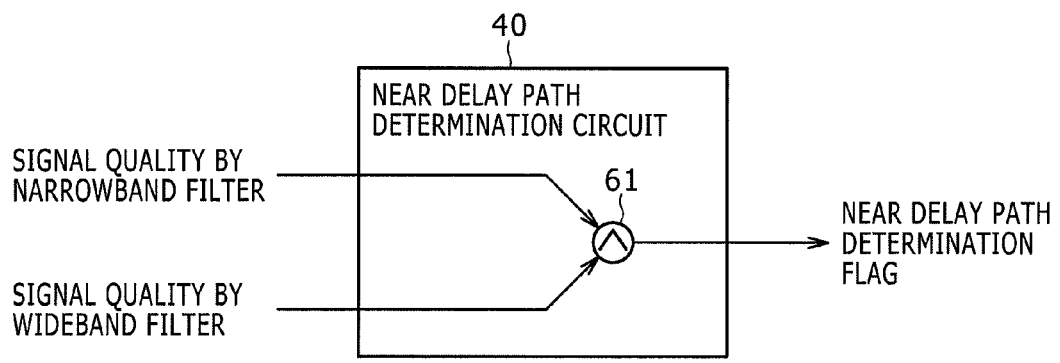
FIG. 18 is a diagram showing a configuration example of a near delay path determination circuit in FIG. 17.

FIG. 18 is a diagram showing a configuration example of the near delay path determination circuit 40.

The signal quality supplied from the optimum value selection circuit 38A and the signal quality supplied from the optimum value selection circuit 38B are input to a comparison circuit 61. Hereinafter, for convenience of description, the best quality of the OFDM frequency domain signal obtained when the narrowband filter is used, supplied from the optimum value selection circuit 38A, will be referred to simply as the signal quality by the narrowband filter. In addition, the best quality of the OFDM frequency domain signal obtained when the wideband filter is used, supplied from the optimum value selection circuit 38B, will be referred to simply as the signal quality by the wideband filter.

The comparison circuit 61 compares the signal quality by the narrowband filter with the signal quality by the wideband filter. If the comparison circuit 61 determines that the signal quality by the narrowband filter is better (the value indicating the signal quality by the narrowband filter, supplied from the optimum value selection circuit 38A, is smaller), then it determines that the channel environment is a near delay path environment and outputs the near delay path determination flag indicating this.

First Modification Example of Configuration of Near Delay Path Determination Circuit 40

Figure 19:
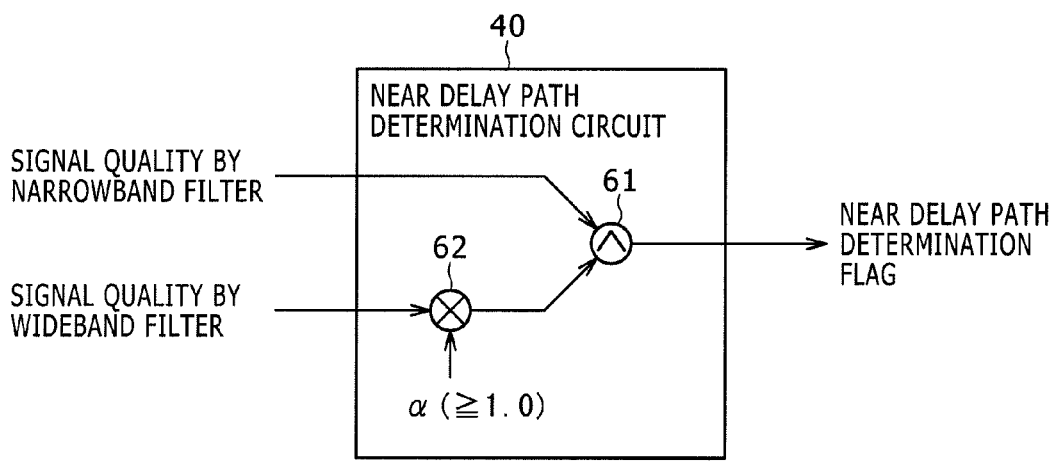
FIG. 19 is a diagram showing another configuration example of the near delay path determination circuit in FIG. 17.

FIG. 19 is a diagram showing another configuration example of the near delay path determination circuit 40.

Of the components shown in FIG. 19, the same components as those in FIG. 18 are given the same numerals. In the example of FIG. 19, a multiplier circuit 62 is provided in addition to the comparison circuit 61. The signal quality by the narrowband filter supplied from the optimum value selection circuit 38A is input to the comparison circuit 61, and the signal quality by the wideband filter supplied from the optimum value selection circuit 38B is input to the multiplier circuit 62.

The multiplier circuit 62 multiplies the signal indicating the signal quality by the wideband filter by a gain $\alpha$ ($\alpha \geq 1.0$) and outputs the resulting signal to the comparison circuit 61. As described above, the smaller the value indicating the signal quality is, the better the quality indicated by this value is. Therefore, the signal quality by the wideband filter is so converted as to become worse quality by the multiplication by the gain $\alpha$, which is equal to or larger than one.

The comparison circuit 61 compares the signal quality by the narrowband filter with the signal quality by the wideband filter resulting from the conversion by the multiplier circuit 62. If the comparison circuit 61 determines that the signal quality by the narrowband filter is better, then it determines that the channel environment is a near delay path environment and outputs the near delay path determination flag indicating this to the FFT interval control circuit 7.

As described above with reference to FIG. 16B, if the channel environment is a near delay path environment, basically the signal quality by the wideband filter is worse than the signal quality by the narrowband filter because a larger amount of white noise is included in the band of the wideband filter.

However, if the amount of white noise is extremely small, a reverse phenomenon often occurs in which the signal quality by the wideband filter is better than the signal quality by the narrowband filter although the channel environment is a near delay path environment. In this case, an error arises in the result of the near delay path determination.

By converting the signal quality by the wideband filter into worse quality through the multiplication by the gain and thereafter making comparison with the signal quality by the narrowband filter, it can be correctly determined that the channel environment is a near delay path environment even when such a reverse phenomenon of the signal quality occurs.

Second Modification Example of Configuration of Near Delay Path Determination Circuit 40

Figure 20:
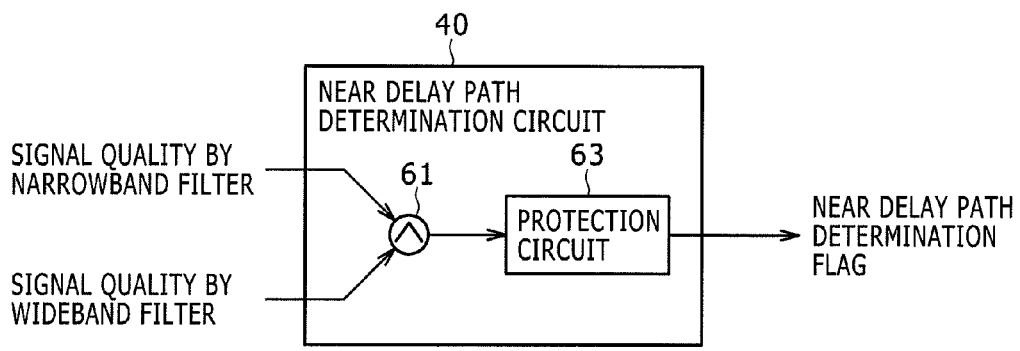
FIG. 20 is a diagram showing further another configuration example of the near delay path determination circuit in FIG. 17.

FIG. 20 is a diagram showing further another configuration example of the near delay path determination circuit 40.

Of the components shown in FIG. 20, the same components as those in FIG. 18 are given the same symbols. In the example of FIG. 20, a protection circuit 63 is provided on the output side of the comparison circuit 61. The signal quality by the narrowband filter supplied from the optimum value selection circuit 38A and the signal quality by the wideband filter supplied from the optimum value selection circuit 38B are input to the comparison circuit 61.

The comparison circuit 61 compares the signal quality by the narrowband filter with the signal quality by the wideband filter, and outputs the comparison result to the protection circuit 63.

The protection circuit 63 determines whether or not the channel environment is a near delay path environment by using plural comparison results by the comparison circuit 61, and outputs the near delay path determination flag indicating the determination result.

For example, the protection circuit 63 determines that the channel environment is a near delay path environment if the number of comparison results indicating that the signal quality by the narrowband filter is better is larger in the past N comparison results including the latest comparison result, supplied from the comparison circuit 61.

Furthermore, it is determined that the channel environment is a near delay path environment if the signal quality by the narrowband filter is better in the past N consecutive comparison results including the latest comparison result, supplied from the comparison circuit 61.

Making the determination by use of plural comparison results can prevent the result of the near delay path determination from being affected by a so-called instantaneous error in the comparison result, such as a phenomenon in which, for only a period for a certain one symbol, a comparison result different from the comparison results in the other period is obtained.

Third Modification Example of Configuration of Near Delay Path Determination Circuit 40

Figure 21:
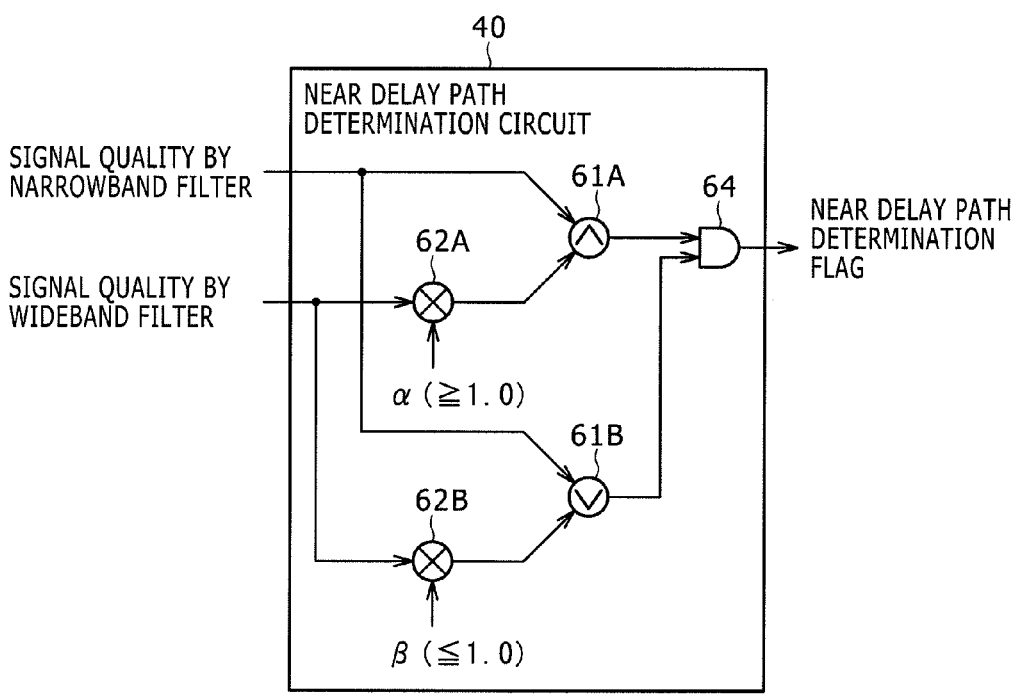
FIG. 21 is a diagram showing further another configuration example of the near delay path determination circuit in FIG. 17.

FIG. 21 is a diagram showing further another configuration example of the near delay path determination circuit 40.

The near delay path determination circuit 40 shown in FIG. 21 includes comparison circuits 61A and 61B, multiplier circuits 62A and 62B, and an AND circuit 64. The signal quality by the narrowband filter supplied from the optimum value selection circuit 38A is input to the comparison circuit 61A and the comparison circuit 61B, and the signal quality by the wideband filter supplied from the optimum value selection circuit 38B is input to the multiplier circuit 62A and the multiplier circuit 62B.

The multiplier circuit 62A multiplies the signal indicating the signal quality by the wideband filter by a gain α (α≧1.0) and outputs the resulting signal to the comparison circuit 61A. By the multiplication by the gain a equal to or larger than one, the signal quality by the wideband filter is so converted as to become worse signal quality.

The multiplier circuit 62B multiplies the signal indicating the signal quality by the wideband filter by a gain β (β≦1.0) and outputs the resulting signal to the comparison circuit 61B. By the multiplication by the gain β equal to or smaller than one, the signal quality by the wideband filter is so converted as to become better signal quality.

The comparison circuit 61A compares the signal quality by the narrowband filter with the signal quality by the wideband filter resulting from the conversion by the multiplier circuit 62A, and outputs the comparison result to the AND circuit 64.

The comparison circuit 61B compares the signal quality by the narrowband filter with the signal quality by the wideband filter resulting from the conversion by the multiplier circuit 62B, and outputs the comparison result to the AND circuit 64.

Based on the comparison result by the comparison circuit 61A and the comparison result by the comparison circuit 61B, the AND circuit 64 determines that the channel environment is a near delay path environment if the following condition is satisfied, and outputs the near delay path determination flag indicating this:

the signal quality by the wideband filter×β≦the signal quality by the narrowband filter≦the signal quality by the wideband filter×α.

The reason why the lower limit (the signal quality by the wideband filter×β) is set as the condition for the determination as to the near delay path environment will be described below.

As described above, the frequency interpolation processing in the frequency direction characteristic interpolation circuit 22 is realized by upsampling the sample values in the time direction characteristic estimation data to the triple sample values and thereafter applying the interpolation filter whose bandwidth is equal to or smaller than Tu/3 to the zero-value interpolation characteristic data.

Figure 22A:
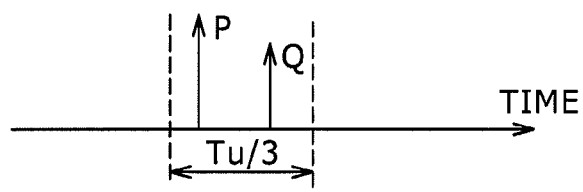
FIGS. 22A to 22C are diagrams showing an example of fold-back components of paths.

FIG. 22A is a diagram showing an example of time direction characteristic estimation data. Similarly to FIG. 12, the horizontal direction indicates the time and the vertical direction indicates the power of a path.

In the example of FIG. 22A, the channel environment is a two-path environment involving a path P and a path Q. The delay spread is equal to or shorter than Tu/3 [seconds]. The time direction characteristic estimation data in the time domain represents an actual profile.

Figure 22B:
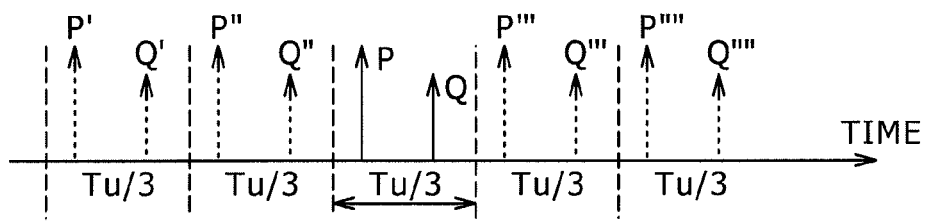

If two zeros are interpolated in the time direction characteristic estimation data like that shown in FIG. 22A and thereby the sample values are upsampled to the triple sample values, fold-back components of the paths arise with a cycle of Tu/3 [seconds] as shown in FIG. 22B.

Figure 22C:
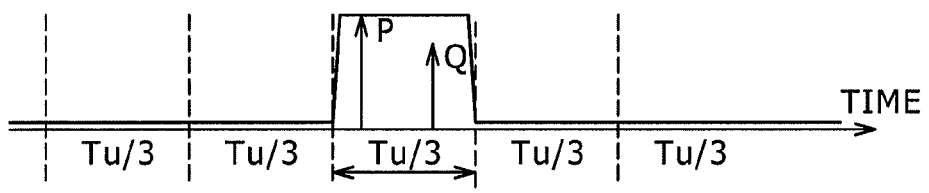

If the delay spread is equal to or shorter than Tu/3 [seconds], applying the wideband filter whose bandwidth is Tu/3 can extract only the desired paths as shown in FIG. 22C.

Next, a discussion will be made below based on the assumption that the channel environment involves a delay path whose delay spread exceeds Tu/3 [seconds].

Figure 23A:
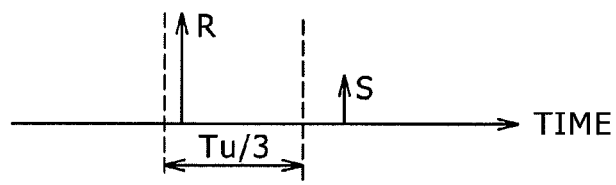
FIGS. 23A to 23C are diagrams showing another example of fold-back components of paths.
Figure 23B:
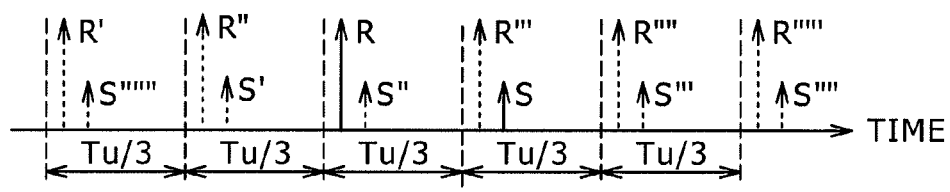

FIG. 23A shows time direction characteristic estimation data in this environment. If two zeros are interpolated in the time direction characteristic estimation data shown in FIG. 23A and thereby the sample values are upsampled to the triple sample values, the fold-back components of the paths appear as those shown in FIG. 23B.

Figure 23C:
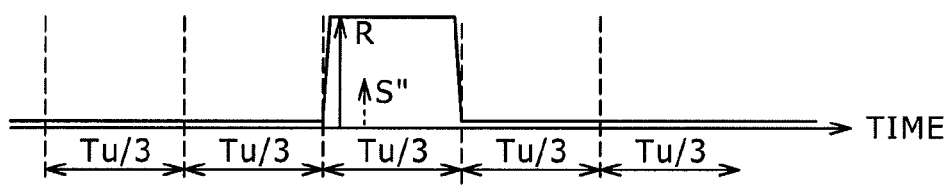

If the wideband filter whose bandwidth is Tu/3 is applied to the upsampled time direction characteristic estimation data on the basis of the position of the path R, the path R and a path S", which is the fold-back component of the path S as the delay path, are included in the band of the wideband filter as shown in FIG. 23C.

That is, the path S as the original delay path component is suppressed by the wideband filter. In this case, the signal quality of the finally-obtained OFDM frequency domain signal is worse. The signal quality is better when the path S" itself is also so suppressed as not to be included in the band than when the path S" is included in the band instead of the path S.

Figure 24:
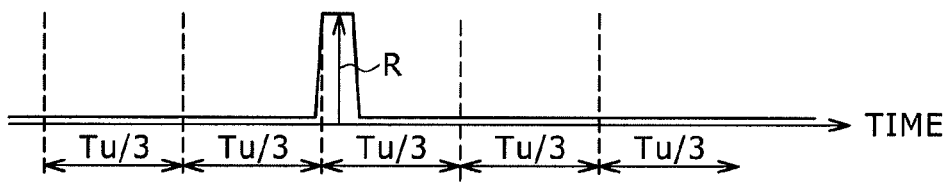
FIG. 24 is a diagram showing a state in which a narrowband filter is applied.

FIG. 24 shows a state in which the narrowband filter is applied instead of the wideband filter in the environment involving a delay path whose delay spread exceeds Tu/3 [seconds].

If the narrowband filter is applied, as shown in FIG. 24, the path S" can be suppressed although the path S can not be included in the band of the narrowband filter. The signal quality when the narrowband filter is applied as shown in FIG. 24 is generally better than that when the wideband filter is applied as shown in FIG. 23C, although depending on the power ratio of the paths.

If the near delay path determination is made with any of the configurations of FIGS. 18 to 20 and a delay path whose delay spread exceeds Tu/3 [seconds] exists, it is determined that the channel environment is a near delay path environment although the channel environment is not a near delay path environment actually.

To address this, the signal quality by the wideband filter resulting from the conversion into better quality through the multiplication by the gain β equal to or smaller than one is set as the lower limit, and it is determined that the channel environment is a near delay path environment only when the above-described condition is satisfied. This can prevent an erroneous determination.

If signal quality that is better than the signal quality by the wideband filter obtained after the conversion and extremely better than the signal quality by the wideband filter before the conversion is calculated as the signal quality by the narrowband filter, the signal quality by the narrowband filter is not trusted and it is determined that the channel environment is not a near delay path environment.

[Operation of Receiver]

The operation of the receiver 100 having the above-described configuration will be described below.

Initially, the reception processing by the receiver 100 will be described below with reference to the flowchart of FIG. 25.

The processing of each step does not necessarily need to be executed in numerical order but may be executed in parallel to the processing of another step or in another order accordingly.

In a step S1, the tuner 2 carries out frequency conversion of an RF signal received by the receiving antenna 1 and outputs an IF signal.

In a step S2, the A/D conversion circuit 3 executes A/D conversion for the IF signal and outputs a digital IF signal.

In a step S3, the quadrature demodulation circuit 4 performs quadrature demodulation and outputs an OFDM time domain signal.

In a step S4, the FFT circuit 6 performs FFT operation in accordance with control by the FFT interval control circuit 7, and outputs an OFDM frequency domain signal.

In a step S5, the SP extraction circuit 8-1 extracts SP signals from the OFDM frequency domain signal and estimates the channel characteristic of the subcarriers for the SP signals.

In a step S6, the time direction characteristic estimation circuit 8-2 estimates the channel characteristic of every third subcarrier and outputs time direction characteristic estimation data.

In a step S7, the delay profile estimation circuit 10 estimates a delay profile based on the time direction characteristic estimation data.

In a step S8, the optimum filter coefficient selection circuit 21 executes filter coefficient selection processing. A coefficient selected by the filter coefficient selection processing is output to the frequency direction characteristic interpolation circuit 22, and a near delay path determination flag indicating the result of a near delay path determination is output to the FFT interval control circuit 7. Details of the filter coefficient selection processing will be described later with reference to the flowchart of FIG. 26.

In a step S9, if the FFT interval control circuit 7 verifies that the channel environment is not a near delay path environment from the near delay path determination flag, then it controls the FFT circuit 6 so that the FFT circuit 6 may perform the FFT operation after removing the GI as described with reference to FIG. 7. On the other hand, if the FFT interval control circuit 7 verifies that the channel environment is a near delay path environment, then it controls the FFT circuit 6 so that the FFT circuit 6 may perform the FFT operation after applying a window function as described with reference to FIG. 8.

In a step S10, the frequency direction characteristic interpolation circuit 22 performs upsampling of the sample values in the time direction characteristic estimation data, and executes frequency interpolation processing by using an interpolation filter whose band and band center position are adjusted based on the coefficient selected by the filter coefficient selection processing.

In a step S11, the divider circuit 8-4 corrects distortion included in the OFDM frequency domain signal based on the channel characteristic of all of the subcarriers, obtained by the frequency interpolation processing.

In a step S12, the error correction circuit 9 executes processing such as error correction for the OFDM frequency domain signal whose distortion has been corrected, and outputs decoded data.

The above-described processing is repeated by the receiver 100 during signal reception.

Details of the filter coefficient selection processing executed in the step S8 in FIG. 25 will be described below with reference to the flowchart of FIG. 26.

This processing is started at the timing when an OFDM frequency domain signal of one symbol is read out from the memory 32 and time direction characteristic estimation data of one symbol is read out from the memory 33.

In a step S21, the controller 31 selects a predetermined position on the time axis as a trial center position.

In a step S22, the narrowband frequency interpolation circuit 34 sets a narrowband filter in matching with the trial center position and executes frequency interpolation processing. Furthermore, the wideband frequency interpolation circuit 35 sets a wideband filter in matching with the trial center position and executes frequency interpolation processing.

In a step S23, the channel distortion correction circuit 36A corrects channel distortion included in the OFDM frequency domain signal based on the channel characteristic obtained by the frequency interpolation processing by the narrowband frequency interpolation circuit 34. Furthermore, the channel distortion correction circuit 36B corrects channel distortion included in the OFDM frequency domain signal based on the channel characteristic obtained by the frequency interpolation processing by the wideband frequency interpolation circuit 35.

In a step S24, the signal quality calculation circuit 37A calculates the quality of the OFDM frequency domain signal whose distortion has been corrected by the channel distortion correction circuit 36A. Furthermore, the signal quality calculation circuit 37B calculates the quality of the OFDM frequency domain signal whose distortion has been corrected by the channel distortion correction circuit 36B. The quality calculated by the signal quality calculation circuit 37A is held by the optimum value selection circuit 38A, and the quality calculated by the signal quality calculation circuit 37B is held by the optimum value selection circuit 38B.

In a step S25, e.g. the signal quality calculation circuit 37A determines whether or not the trials of the frequency interpolation processing for all patterns with change in the center position of the band of the interpolation filter have been completed for the subject symbol. If it is determined in the step S25 that the trials of the frequency interpolation processing for all patterns have not yet been completed, the processing returns to the step S21, so that the above-described processing is repeated after changing the trial center position.

On the other hand, if it is determined in the step S25 that the trials of the frequency interpolation processing for all patterns have been completed, then in a step S26, the optimum value selection circuit 38A selects the optimum center position of the narrowband filter based on the trial result for all patterns. Furthermore, the optimum value selection circuit 38B selects the optimum center position of the narrowband filter based on the trial result for all patterns.

In a step S27, the narrow/wide selection circuit 39 compares the quality supplied from the optimum value selection circuit 38A with the quality supplied from the optimum value selection circuit 38B and selects the optimum filter center. The narrow/wide selection circuit 39 outputs a coefficient representing the optimum filter center and the band (the narrowband filter or the wideband filter) whose center position is to be adjusted to the optimum filter center.

In a step S28, the near delay path determination circuit 40 makes a near delay path determination based on the signal quality supplied from the optimum value selection circuits 38A and 38B, and outputs a near delay path determination flag.

Figure 25:
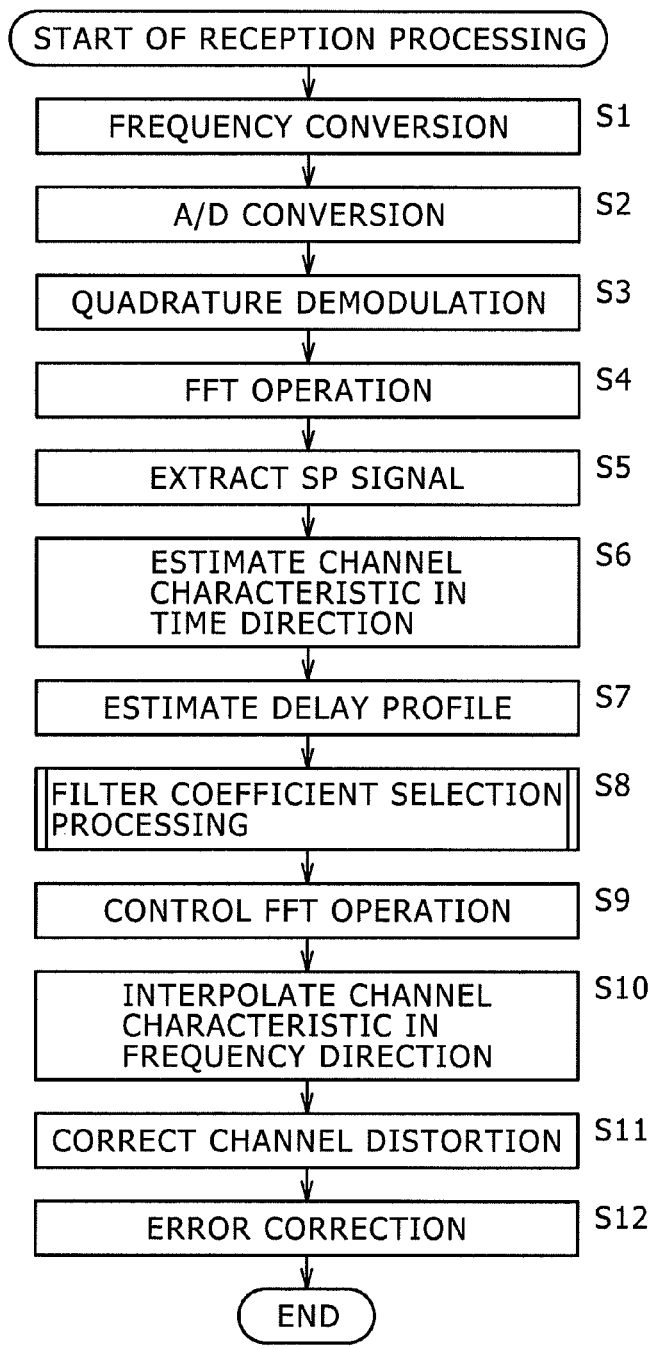
FIG. 25 is a flowchart for explaining reception processing of the receiver.
Figure 26:
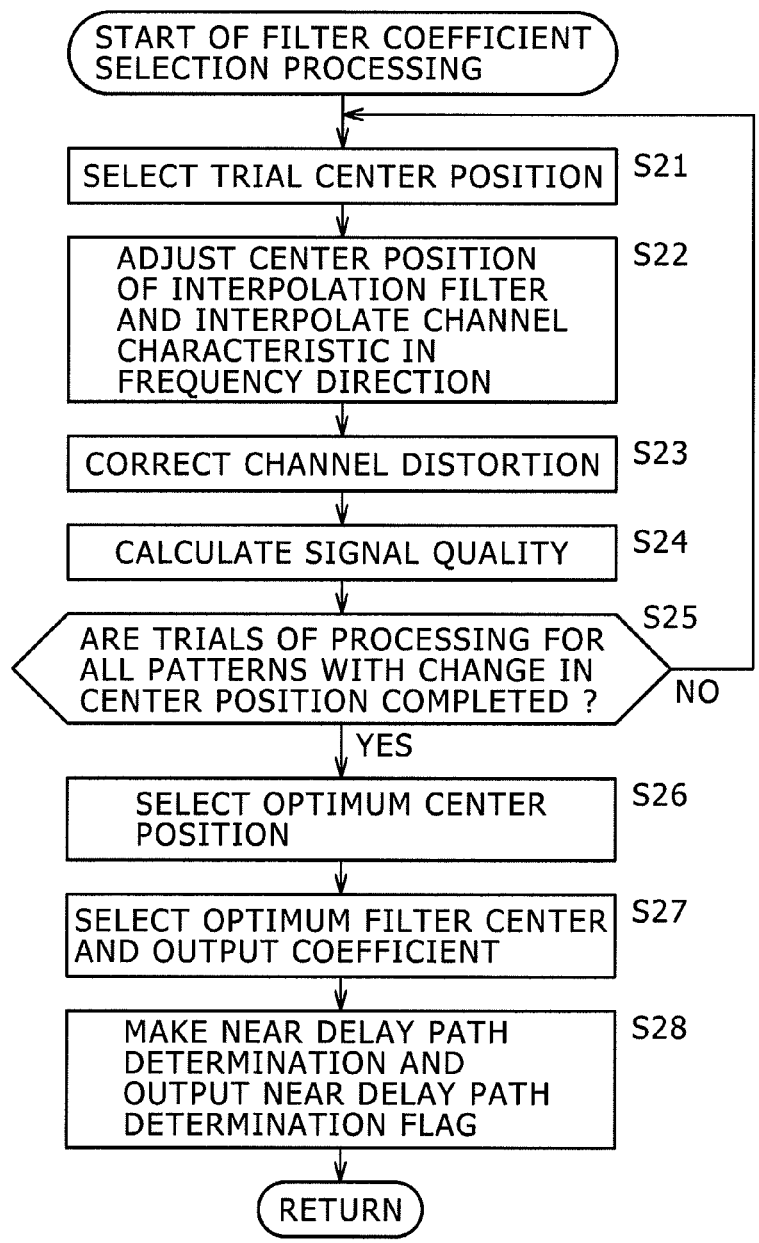
FIG. 26 is a flowchart for explaining filter coefficient selection processing executed in a step S8 in FIG. 25.

Thereafter, the processing returns to the step S8 in FIG. 25, so that the subsequent processing is executed.

Through the above-described processing, whether or not the channel environment is a near delay path environment can be determined with high precision without using an estimated delay profile.

Furthermore, the FFT operation can be performed with the GI removed when the channel environment is not a near delay path environment, and the FFT operation can be performed with the effective utilization of the GI when the channel environment is a near delay path environment. Because the result of the near delay path determination is obtained with high precision, the switching of the FFT operation dependent on the environment can be prevented from being erroneously carried out.

Moreover, the frequency interpolation processing can be executed by using the narrowband filter if the channel environment is a near delay path environment, and the frequency interpolation processing can be executed by using the wideband filter if the channel environment is not a near delay path environment. Because the result of the near delay path determination is obtained with high precision, the switching of the interpolation filter dependent on the environment can be prevented from being erroneously carried out.

2. Second Embodiment

Figure 27:
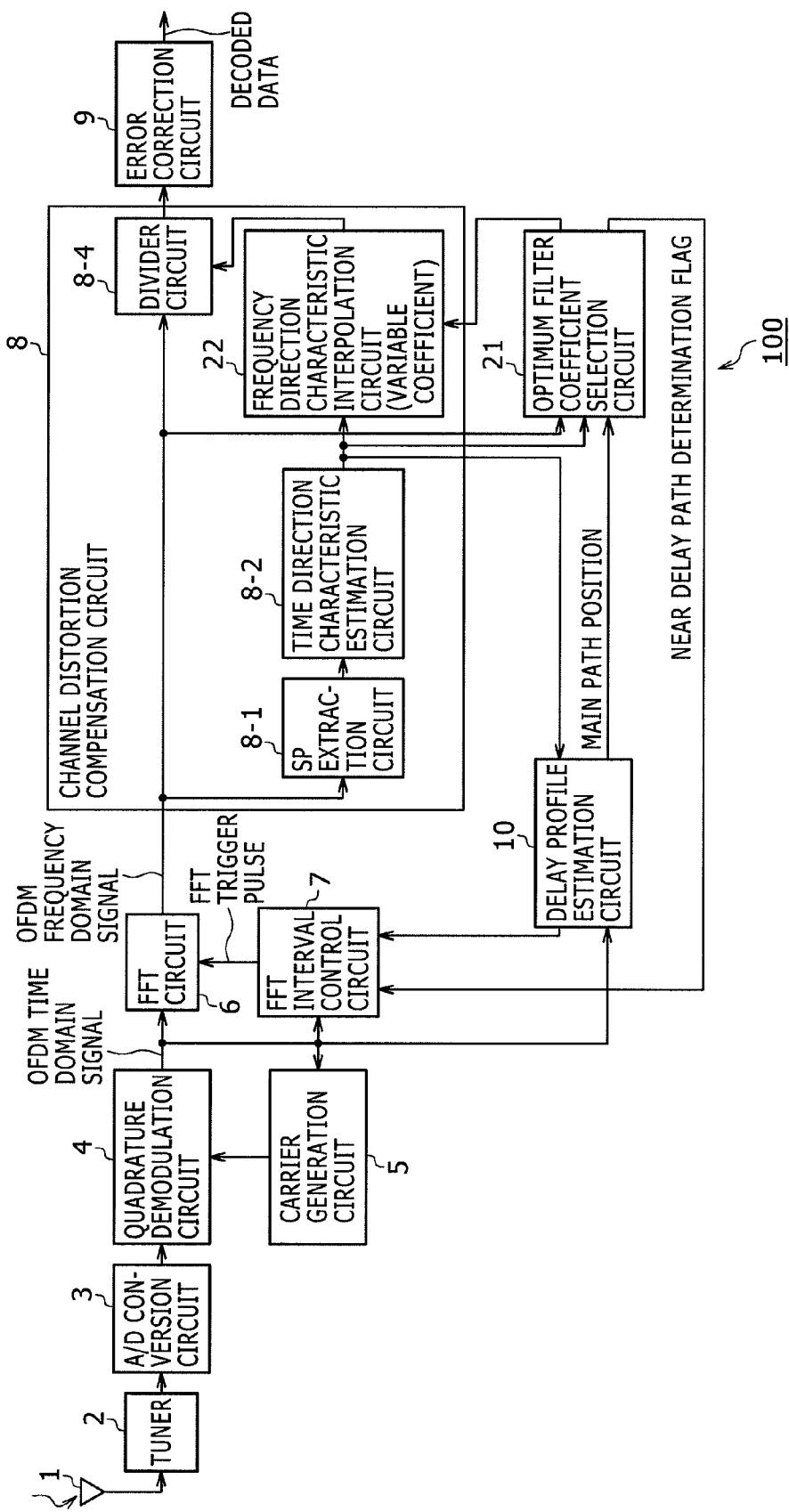
FIG. 27 is a block diagram showing another configuration example of the receiver according to one embodiment of the present invention.

FIG. 27 is a block diagram showing another configuration example of the receiver 100 according to one embodiment of the present invention.

Of the components shown in FIG. 27, the same components as those in FIG. 6 are given the same symbols. Overlapping description is omitted. The configuration of the receiver 100 shown in FIG. 27 is different from the configuration of FIG. 6 in that a main path position is supplied from the delay profile estimation circuit 10 to the optimum filter coefficient selection circuit 21.

The delay profile estimation circuit 10 in FIG. 27 specifies the main path position based on an estimated delay profile and outputs the main path position to the optimum filter coefficient selection circuit 21.

The optimum filter coefficient selection circuit 21, which carries out trials of frequency interpolation processing to select the center position of the interpolation filter and so on and make the near delay path determination, uses the main path position specified by the delay profile estimation circuit 10 in this near delay path determination. The optimum filter coefficient selection circuit 21 outputs, to the FFT interval control circuit 7, a near delay path determination flag indicating the result of the near delay path determination made by using the main path position.

Figure 28:
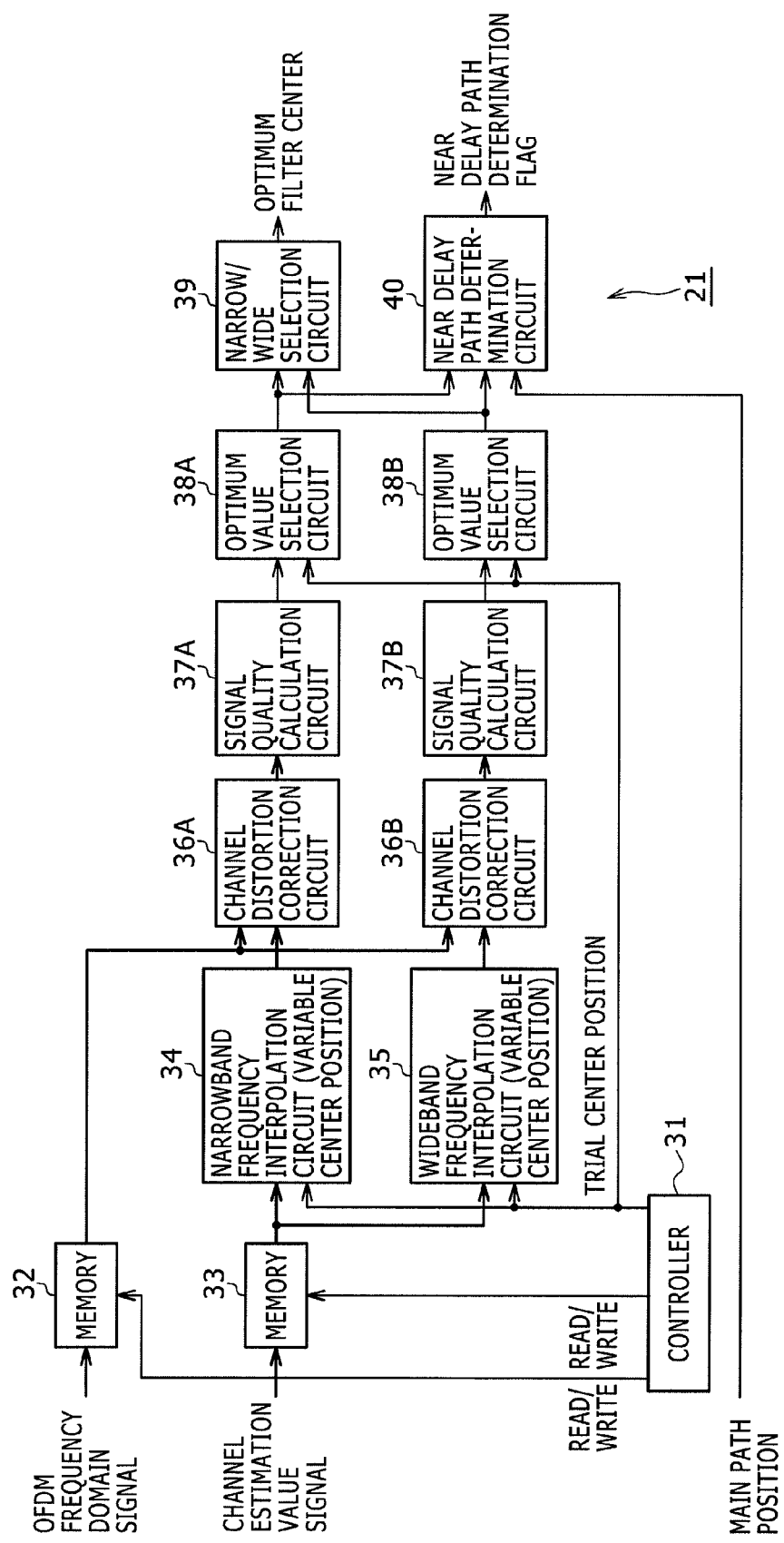
FIG. 28 is a diagram showing a configuration example of an optimum filter coefficient selection circuit in FIG. 27.

FIG. 28 is a diagram showing a configuration example of the optimum filter coefficient selection circuit 21 in FIG. 27.

Of the components shown in FIG. 28, the same components as those in FIG. 17 are given the same symbols. Overlapping description is omitted. The configuration of the optimum filter coefficient selection circuit 21 shown in FIG. 28 is different from the configuration of FIG. 17 in that a main path position output from the delay profile estimation circuit 10 is input to the near delay path determination circuit 40.

The near delay path determination circuit 40 compares the signal quality by the narrowband filter with the signal quality by the wideband filter similarly to the near delay path determination circuit 40 in FIG. 17.

Furthermore, the near delay path determination circuit 40 utilizes a characteristic that the optimum center position of the narrowband filter selected by the optimum value selection circuit 38A substantially corresponds with the main path position if the channel environment is a near delay path environment. Specifically, the near delay path determination circuit 40 compares the absolute value of the difference between the optimum center position of the narrowband filter and the main path position with a threshold value.

The near delay path determination circuit 40 determines that the channel environment is a near delay path environment if the signal quality by the narrowband filter is better than the signal quality by the wideband filter and the absolute value of the difference between the optimum center position of the narrowband filter and the main path position is lower than the threshold value.

On the other hand, the near delay path determination circuit 40 determines that the channel environment is not a near delay path environment if the signal quality by the narrowband filter is worse than the signal quality by the wideband filter or the absolute value of the difference between the optimum center position of the narrowband filter and the main path position is larger than the threshold value.

Figure 29:
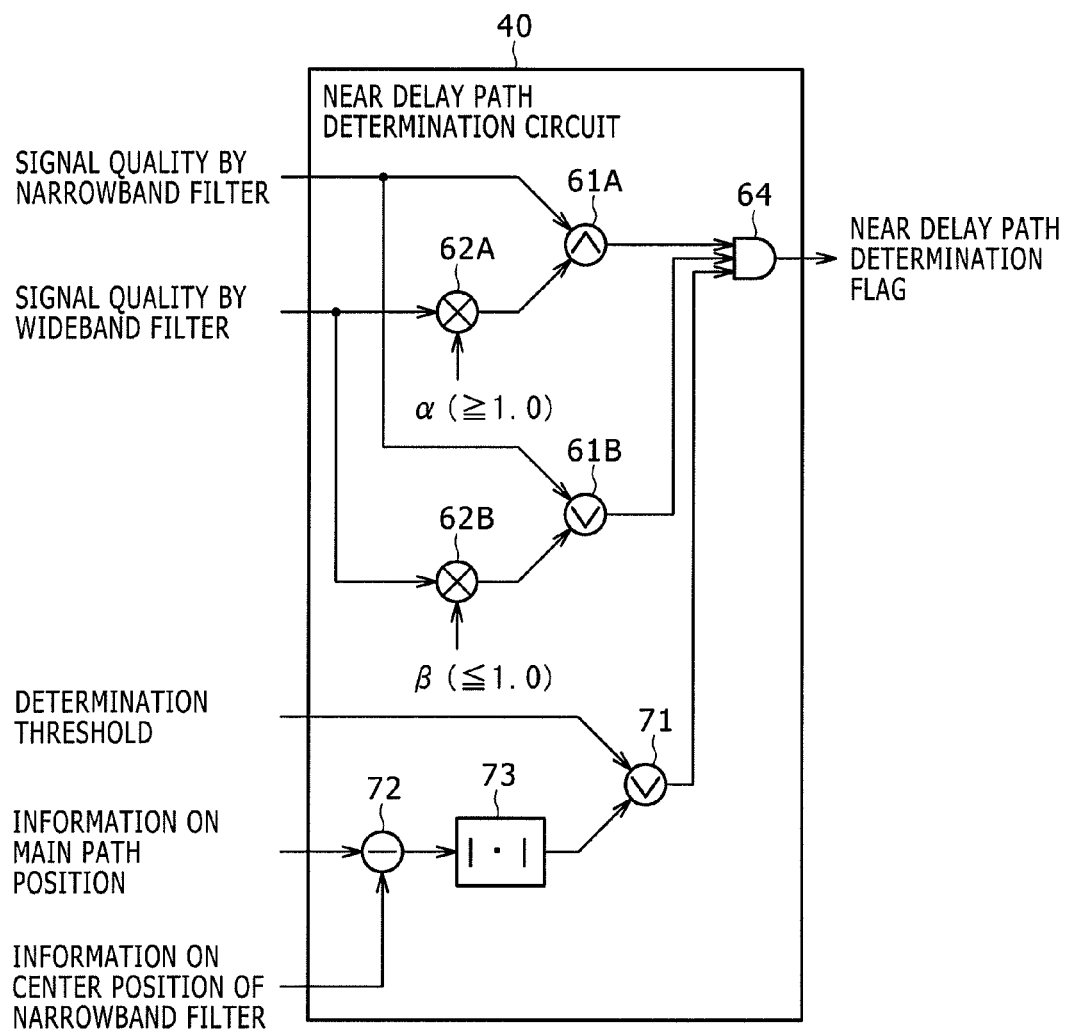
FIG. 29 is a diagram showing a configuration example of a near delay path determination circuit in FIG. 28.

FIG. 29 is a diagram showing a configuration example of the near delay path determination circuit 40 in FIG. 28.

In the example of FIG. 29, a configuration for executing processing with use of a main path position is added to the configuration described with reference to FIG. 21. Overlapping description is accordingly omitted. It is also possible to add the configuration for executing processing with use of a main path position to the configuration described with FIG. 18, FIG. 19, or FIG. 20 to thereby realize the near delay path determination circuit 40 of FIG. 28.

The signal quality by the narrowband filter supplied from the optimum value selection circuit 38A is input to the comparison circuit 61A and the comparison circuit 61B, and the signal quality by the wideband filter supplied from the optimum value selection circuit 38B is input to the multiplier circuit 62A and the multiplier circuit 62B. Furthermore, a main path position supplied from the delay profile estimation circuit 10 and the optimum center position of the narrowband filter supplied from the optimum value selection circuit 38A are input to a subtractor circuit 72.

The subtractor circuit 72 calculates the difference between the optimum center position of the narrowband filter and the main path position and outputs the difference to an absolute value operation circuit 73.

The absolute value operation circuit 73 calculates the absolute value of the difference calculated by the subtractor circuit 72 and outputs the absolute value to a comparison circuit 71.

The comparison circuit 71 compares a threshold value with the absolute value of the difference, calculated by the absolute value operation circuit 73, and outputs the comparison result to the AND circuit 64.

The AND circuit 64 determines that the channel environment is a near delay path environment if the comparison result by the comparison circuit 61A and the comparison result by the comparison circuit 61B satisfy the above-described condition and the comparison result by the comparison circuit 71 indicates that the absolute value of the difference between the optimum center position of the narrowband filter and the main path position is smaller than the threshold value. The AND circuit 64 outputs the near delay path determination flag indicating the determination result.

Using the main path position in this manner allows making of the near delay path determination with higher precision compared with the case in which the main path position is not used.

It is also possible to use another position such as the center position between the main path position and a delay path position, instead of the main path position.

The above-described series of processing can be executed by hardware or alternatively by software. In the case of executing the series of processing by software, the program serving as the software is installed from a program recording medium into a computer incorporated in dedicated hardware, a general-purpose personal computer, or the like.

FIG. 30 is a block diagram showing a configuration example of hardware of a computer that executes the above-described series of processing based on a program.

A central processing unit (CPU) 81, a read only memory (ROM) 82, and a random access memory (RAM) 83 are connected to each other by a bus 84.

An input/output interface 85 is also connected to the bus 84. To the input/output interface 85, an input unit 86 formed of e.g. a keyboard and a mouse and an output unit 87 formed of e.g. a display and a speaker are connected. Furthermore, to the bus 84, a memory 88 formed of e.g. a hard disk or a nonvolatile memory, a communication unit 89 formed of e.g. a network interface, and a drive 90 for driving a removable medium 91 are connected.

In the computer having the above-described configuration, for example, the CPU 81 loads a program stored in the memory 88 into the RAM 83 via the input/output interface 85 and the bus 84 and executes the program, whereby the above-described series of processing is executed.

For example, the program to be executed by the CPU 81 is recorded in the removable medium 91 or provided via a wired or wireless transmission medium such as a local area network, the Internet, or digital broadcasting so as to be installed into the memory 88.

The program to be executed by the computer may be a program that is processed in a time-series manner along the order described in the present specification or alternatively may be a program that is processed in parallel or at the necessary timing such as a timing when calling is carried out.

The embodiments of the present invention are not limited to the above-described embodiments but various changes may be incorporated therein without departing from the gist of the present invention.

The present application contains subject matter related to that disclosed in Japanese Priority Patent Application JP 2008-240275 filed in the Japan Patent Office on Sep. 19, 2008, the entire content of which is hereby incorporated by reference.

What is claimed is:

1. A receiving device comprising:
    a pilot signal extractor configured to extract a pilot signal from a received orthogonal frequency division multiplexing (OFDM) signal;
    an estimator configured to estimate a characteristic of a channel of the OFDM signal for the pilot signal and interpolate a channel characteristic in a time direction to thereby obtain a channel characteristic of every predetermined number of subcarriers;
    an interpolator configured to carry out filtering of the channel characteristic of every predetermined number of subcarriers by an interpolation filter having a first band for interpolating a channel characteristic in a frequency direction to thereby obtain a first all-subcarrier channel characteristic, and carry out filtering of the channel characteristic of every predetermined number of subcarriers by an interpolation filter having a second band wider than the first band for interpolating a channel characteristic in the frequency direction to thereby obtain a second all-subcarrier channel characteristic;
    a distortion corrector configured to correct distortion of the OFDM signal by using the first all-subcarrier channel characteristic and correct distortion of the OFDM signal by using the second all-subcarrier channel characteristic;
    a calculator configured to calculate quality of each of the OFDM signals whose distortion has been corrected; and
    a determiner configured to determine whether or not a channel environment is a single path environment or a near delay path environment in which all paths are allowed to be included in a passband of an interpolation filter having the first band, based on quality of a first distortion-corrected signal that is the OFDM signal whose distortion has been corrected by using the first all-subcarrier channel characteristic and quality of a second distortion-corrected signal that is the OFDM signal whose distortion has been corrected by using the second all-subcarrier channel characteristic.

2. The receiving device according to claim 1, wherein
    if a channel characteristic interpolated in the time direction is obtained by the estimator for every N-th subcarrier and a useful symbol duration of an OFDM symbol of the OFDM signal as a duration that does not include a guard interval is Tu seconds,
    a passband of an interpolation filter having the first band and a passband of an interpolation filter having the second band are equal to or narrower than Tu/N seconds.

3. The receiving device according to claim 1, further comprising
    a fast Fourier transform (FFT) operation unit configured to perform FFT operation after applying a window function to an OFDM time domain signal representing a symbol as a processing subject if it is determined that the channel environment is the single path environment or the near delay path environment, and perform FFT operation without applying the window function to an OFDM time domain signal representing a symbol as a processing subject if it is determined that the channel environment is neither the single path environment nor the near delay path environment.

4. The receiving device according to claim 3, wherein
    the window function is a function for multiplying, by ½, amplitude of a signal of a guard interval of a symbol as a processing subject and amplitude of a signal of an interval as a copy source for the guard interval to add signals whose amplitude is turned to ½ to each other and multiplying, by 1, amplitude of a signal of an interval other than the intervals in which amplitude is turned to ½.

5. The receiving device according to claim 1, wherein
    the determiner determines that the channel environment is the single path environment or the near delay path environment if the quality of the first distortion-corrected signal is better than the quality of the second distortion-corrected signal.

6. The receiving device according to claim 1, wherein
    the determiner determines that the channel environment is the single path environment or the near delay path environment if the quality of the first distortion-corrected signal is better than quality of the second distortion-corrected signal resulting from conversion into worse quality by multiplication by a predetermined coefficient.

7. The receiving device according to claim 1, wherein
    if the quality of the first and second distortion-corrected signals is calculated by the calculator every predetermined period,
    the determiner determines that the channel environment is the single path environment or the near delay path environment if the quality of the first distortion-corrected signal is better than the quality of the second distortion-corrected signal continuously over a plurality of the predetermined periods or, of a plurality of the predetermined periods, a period during which the quality of the first distortion-corrected signal is better than the quality of the second distortion-corrected signal is longer than a period during which the quality of the second distortion-corrected signal is better than the quality of the first distortion-corrected signal.

8. The receiving device according to claim 1, wherein the determiner determines that the channel environment is the single path environment or the near delay path environment if the quality of the first distortion-corrected signal is worse than quality of the second distortion-corrected signal resulting from conversion into better quality by multiplication by a predetermined coefficient and is better than quality of the second distortion-corrected signal resulting from conversion into worse quality by multiplication by a coefficient different from the predetermined coefficient.

9. The receiving device according to claim 1, further comprising
a controller configured to change a center position of a band of an interpolation filter having the first band and a center position of a band of an interpolation filter having the second band.

10. The receiving device according to claim 9, further comprising:
a selector configured to make selection as to which of an interpolation filter having the first band and an interpolation filter having the second band is an interpolation filter used to obtain a distortion-corrected signal having best quality and a center position of a band of the interpolation filter used to obtain the distortion-corrected signal having the best quality, based on quality of a plurality of the first and second distortion-corrected signals acquired through change in a center position of a band;
a variable coefficient interpolator configured to set an interpolation filter selected by the selector in such a way that a center position of a band of the interpolation filter is set at a same position as a center position selected by the selector, and carry out filtering of the channel characteristic of every predetermined number of subcarriers estimated by the estimator by using the set interpolation filter for interpolating a channel characteristic in the frequency direction to thereby obtain an all-subcarrier channel characteristic; and
an equalizer configured to carry out equalization by correcting distortion of the OFDM signal by using the all-subcarrier channel characteristic obtained by the variable coefficient interpolator.

11. The receiving device according to claim 9, further comprising
a delay profile estimator configured to estimate a delay profile based on the OFDM signal, wherein
the determiner determines that the channel environment is the single path environment or the near delay path environment if the quality of the first distortion-corrected signal is better than the quality of the second distortion-corrected signal and difference between a main path position represented by a delay profile estimated by the delay profile estimator and a center position of the first band of an interpolation filter used to obtain the first distortion-corrected signal having best quality is smaller than a threshold value.

12. A receiving method comprising the steps of:
extracting a pilot signal from a received orthogonal frequency division multiplexing (OFDM) signal;
estimating a characteristic of a channel of the OFDM signal for the pilot signal and interpolating a channel characteristic in a time direction to thereby obtain a channel characteristic of every predetermined number of subcarriers;
carrying out filtering of the channel characteristic of every predetermined number of subcarriers by an interpolation filter having a first band for interpolating a channel characteristic in a frequency direction to thereby obtain a first all-subcarrier channel characteristic, and carrying out filtering of the channel characteristic of every predetermined number of subcarriers by an interpolation filter having a second band wider than the first band for interpolating a channel characteristic in the frequency direction to thereby obtain a second all-subcarrier channel characteristic;
correcting distortion of the OFDM signal by using the first all-subcarrier channel characteristic and correcting distortion of the OFDM signal by using the second all-subcarrier channel characteristic;
calculating quality of each of the OFDM signals whose distortion has been corrected; and
determining whether or not a channel environment is a single path environment or a near delay path environment in which all paths are allowed to be included in a passband of an interpolation filter having the first band, based on quality of a first distortion-corrected signal that is the OFDM signal whose distortion has been corrected by using the first all-subcarrier channel characteristic and quality of a second distortion-corrected signal that is the OFDM signal whose distortion has been corrected by using the second all-subcarrier channel characteristic.

13. A program causing a computer to execute processing, the processing comprising the steps of:
extracting a pilot signal from a received OFDM signal;
estimating a characteristic of a channel of the OFDM signal for the pilot signal and interpolating a channel characteristic in a time direction to thereby obtain a channel characteristic of every predetermined number of subcarriers;
carrying out filtering of the channel characteristic of every predetermined number of subcarriers by an interpolation filter having a first band for interpolating a channel characteristic in a frequency direction to thereby obtain a first all-subcarrier channel characteristic, and carrying out filtering of the channel characteristic of every predetermined number of subcarriers by an interpolation filter having a second band wider than the first band for interpolating a channel characteristic in the frequency direction to thereby obtain a second all-subcarrier channel characteristic;
correcting distortion of the OFDM signal by using the first all-subcarrier channel characteristic and correcting distortion of the OFDM signal by using the second all-subcarrier channel characteristic;
calculating quality of each of the OFDM signals whose distortion has been corrected; and
determining whether or not a channel environment is a single path environment or a near delay path environment in which all paths are allowed to be included in a passband of an interpolation filter having the first band, based on quality of a first distortion-corrected signal that is the OFDM signal whose distortion has been corrected by using the first all-subcarrier channel characteristic and quality of a second distortion-corrected signal that is the OFDM signal whose distortion has been corrected by using the second all-subcarrier channel characteristic.

14. A receiving device comprising:

pilot signal extraction means for extracting a pilot signal from a received orthogonal frequency division multiplexing (OFDM) signal;

estimation means for estimating a characteristic of a channel of the OFDM signal for the pilot signal and interpolating a channel characteristic in a time direction to thereby obtain a channel characteristic of every predetermined number of subcarriers;

interpolation means for carrying out filtering of the channel characteristic of every predetermined number of subcarriers by an interpolation filter having a first band for interpolating a channel characteristic in a frequency direction to thereby obtain a first all-subcarrier channel characteristic, and carrying out filtering of the channel characteristic of every predetermined number of subcarriers by an interpolation filter having a second band wider than the first band for interpolating a channel characteristic in the frequency direction to thereby obtain a second all-subcarrier channel characteristic;

distortion correction means for correcting distortion of the OFDM signal by using the first all-subcarrier channel characteristic and correcting distortion of the OFDM signal by using the second all-subcarrier channel characteristic;

calculation means for calculating quality of each of the OFDM signals whose distortion has been corrected; and determination means for determining whether or not a channel environment is a single path environment or a near delay path environment in which all paths are allowed to be included in a passband of an interpolation filter having the first band, based on quality of a first distortion-corrected signal that is the OFDM signal whose distortion has been corrected by using the first all-subcarrier channel characteristic and quality of a second distortion-corrected signal that is the OFDM signal whose distortion has been corrected by using the second all-subcarrier channel characteristic.

* * * * *